US011300803B2

United States Patent
Lin et al.

(10) Patent No.: US 11,300,803 B2
(45) Date of Patent: Apr. 12, 2022

(54) OPTICAL ELEMENT DRIVING MECHANISM

(71) Applicant: TDK TAIWAN CORP., Taoyuan (TW)

(72) Inventors: Meng-Ting Lin, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 158 days.

(21) Appl. No.: 16/740,812

(22) Filed: Jan. 13, 2020

(65) Prior Publication Data

US 2020/0285068 A1 Sep. 10, 2020

Related U.S. Application Data

(60) Provisional application No. 62/814,543, filed on Mar. 6, 2019.

(30) Foreign Application Priority Data

Dec. 20, 2019 (EP) ..................................... 19218896

(51) Int. Cl.
G02B 7/09 (2021.01)
G02B 27/64 (2006.01)
G02B 7/10 (2021.01)
H02K 11/215 (2016.01)
G03B 13/36 (2021.01)
H02K 41/035 (2006.01)

(52) U.S. Cl.
CPC ............. *G02B 27/646* (2013.01); *G02B 7/09* (2013.01); *G02B 7/10* (2013.01); *G03B 13/36* (2013.01); *H02K 11/215* (2016.01); *H02K 41/0356* (2013.01)

(58) Field of Classification Search
CPC ............. H02K 11/215; H02K 41/0356; G02B 27/646; G02B 27/64; G02B 7/09; G02B 7/10; G02B 7/04; G03B 13/36; G03B 13/34; G03B 13/32
USPC ........................................................ 359/554
See application file for complete search history.

(56) References Cited

U.S. PATENT DOCUMENTS

| | | | | |
|---|---|---|---|---|
| 8,041,201 B2* | 10/2011 | Eromaki | ............... | G02B 27/646 396/55 |
| 2009/0252488 A1* | 10/2009 | Eromaki | ............... | G02B 27/646 396/529 |
| 2016/0209621 A1* | 7/2016 | Park | ...................... | G02B 27/646 |
| 2016/0274328 A1* | 9/2016 | Shin | ......................... | G02B 7/08 |
| 2016/0320585 A1* | 11/2016 | Park | ..................... | H04N 5/2257 |

(Continued)

*Primary Examiner* — William R Alexander
(74) *Attorney, Agent, or Firm* — Muncy, Geissler, Olds & Lowe, P.C.

(57) ABSTRACT

An optical element driving mechanism is provided. The optical element driving mechanism includes a fixed part, a movable part, a driving assembly, and a sensing assembly. The fixed part has a main axis. The fixed part includes a case and a bottom. The case and the bottom are arranged along the main axis. The movable part moves relative to the fixed part. The movable part may hold an optical element with an optical axis. The driving assembly drives the movable part to move relative to the fixed part. The sensing assembly senses a movement condition of the movable part relative to the fixed part. The sensing assembly includes a sensor. The sensor is disposed on the bottom.

20 Claims, 20 Drawing Sheets

(56) References Cited

U.S. PATENT DOCUMENTS

| | | | | |
|---|---|---|---|---|
| 2016/0373000 A1* | 12/2016 | Park | .................... | H02K 41/0356 |
| 2017/0090148 A1* | 3/2017 | Park | ..................... | G02B 27/646 |
| 2017/0146773 A1* | 5/2017 | Park | ................... | H02K 41/0356 |
| 2017/0299843 A1* | 10/2017 | Lee | ......................... | G02B 7/09 |
| 2019/0265506 A1* | 8/2019 | Park | ..................... | H04N 5/2254 |

* cited by examiner

OPTICAL ELEMENT DRIVING MECHANISM

CROSS-REFERENCE TO RELATED APPLICATIONS

The present application claims priority of U.S. Provisional Patent Application No. 62/814,543, filed on Mar. 6, 2019 and European Patent Application No. 19218896.9 filed on Dec. 20, 2019, which are incorporated by reference herein in their entireties.

BACKGROUND OF THE DISCLOSURE

Field of the Disclosure

The present disclosure relates to a driving mechanism, and more particularly to an optical element driving mechanism.

Description of the Related Art

As technology has developed, nowadays many electronic devices (such as a tablet computers and smartphones) are equipped with the functionality of shooting images and recording video. A user may operate an electronic device to capture various images and video thanks to an optical element and an optical element driving mechanism disposed on the electronic device.

When the user uses the electronic device equipped with the optical element driving mechanism, shock or vibration may occur, and this may cause the image or video to come out blurry. Demand for higher quality in images or videos is increasing, and an optical element driving mechanism that is able to achieve auto focus (AF) is required in order to focus on the scene.

BRIEF SUMMARY OF THE DISCLOSURE

According to some embodiments of the disclosure, an optical element driving mechanism is provided. The optical element driving mechanism includes a fixed part, a movable part, a driving assembly, and a sensing assembly. The fixed part has a main axis. The fixed part includes a case and a bottom. The case and the bottom are arranged along the main axis. The movable part moves relative to the fixed part. The movable part may hold an optical element with an optical axis. The driving assembly drives the movable part to move relative to the fixed part. The sensing assembly senses a movement condition of the movable part relative to the fixed part. The sensing assembly includes a sensor. The sensor is disposed on the bottom.

According to some embodiments, the driving assembly drives the movable part to move relative to the fixed part along a direction that is parallel to the optical axis, the fixed part further includes a circuit assembly electrically connected to the sensing assembly, and when viewed along the main axis, the driving assembly partially overlaps the circuit assembly. According to some embodiments, when viewed along a direction that is perpendicular to the main axis, the sensor partially overlaps the bottom. According to some embodiments, the bottom includes a receiving portion for receiving the sensor, and when viewed along a direction that is perpendicular to the main axis, a bottom surface of the bottom is farther away from the case than a bottom surface of the sensing assembly in a direction of the main axis. According to some embodiments, the optical element driving mechanism further includes an adhesion element disposed in the receiving portion. The adhesion element contacts the sensor and the circuit assembly. According to some embodiments, the adhesion element is disposed between the circuit assembly and the bottom, wherein the adhesion element contacts the circuit assembly and the bottom. According to some embodiments, the optical element driving mechanism further includes an electronic element. The electronic element is disposed on the circuit assembly. The adhesion element contacts the electronic element and the circuit assembly. According to some embodiments, the optical element driving mechanism further includes an outside-connection circuit member. The sensor is electrically connected to the outside-connection circuit member via the circuit assembly.

According to some embodiments, the optical element driving mechanism further includes a loop member and an electrical connection piece. A portion of the loop member is embedded in the bottom. The circuit assembly is electrically connected to the loop member via the electrical connection piece. According to some embodiments, a portion of the electrical connection piece is disposed on a surface of the circuit assembly that faces the bottom. According to some embodiments, when viewed along a direction that is perpendicular to the main axis, the electrical connection piece is disposed between the bottom and the circuit assembly. According to some embodiments, when viewed along a direction that is perpendicular to the main axis, the electrical connection piece partially overlaps the case. According to some embodiments, the adhesion element contacts the electrical connection piece and the case. According to some embodiments, the bottom further includes an opening. A portion of the electrical connection piece is disposed on an edge of the opening. According to some embodiments, when viewed along a direction that is perpendicular to the main axis, a portion of the bottom is located between the electrical connection piece and the case.

According to some embodiments, the optical element driving mechanism further includes an elastic element. The movable part is movably connected to the fixed part via the elastic element. The sensor is electrically connected to the driving assembly via the circuit assembly, the loop member, and the elastic element consecutively. According to some embodiments, the electrical connection piece contacts the loop member, the elastic element, and the circuit assembly. According to some embodiments, the bottom further includes a supporting platform, the elastic element is disposed on the supporting platform, and the supporting platform is closer to the case than the circuit assembly in a direction of the main axis. According to some embodiments, when viewed along the main axis, the supporting platform does not overlap the circuit assembly. According to some embodiments, when viewed along the main axis, the supporting platform does not overlap the sensor.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
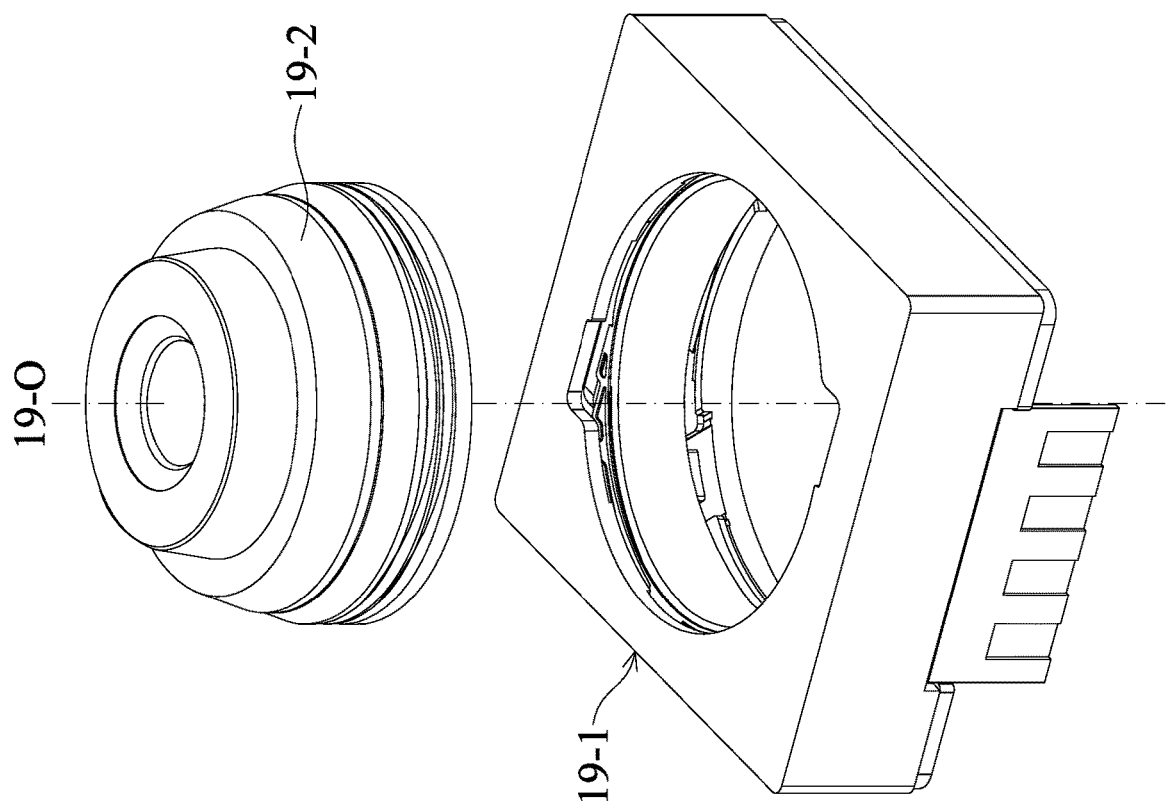
FIG. 1 is a perspective view of an optical element driving mechanism and an optical element in accordance with some embodiments of this disclosure.
Figure 2:
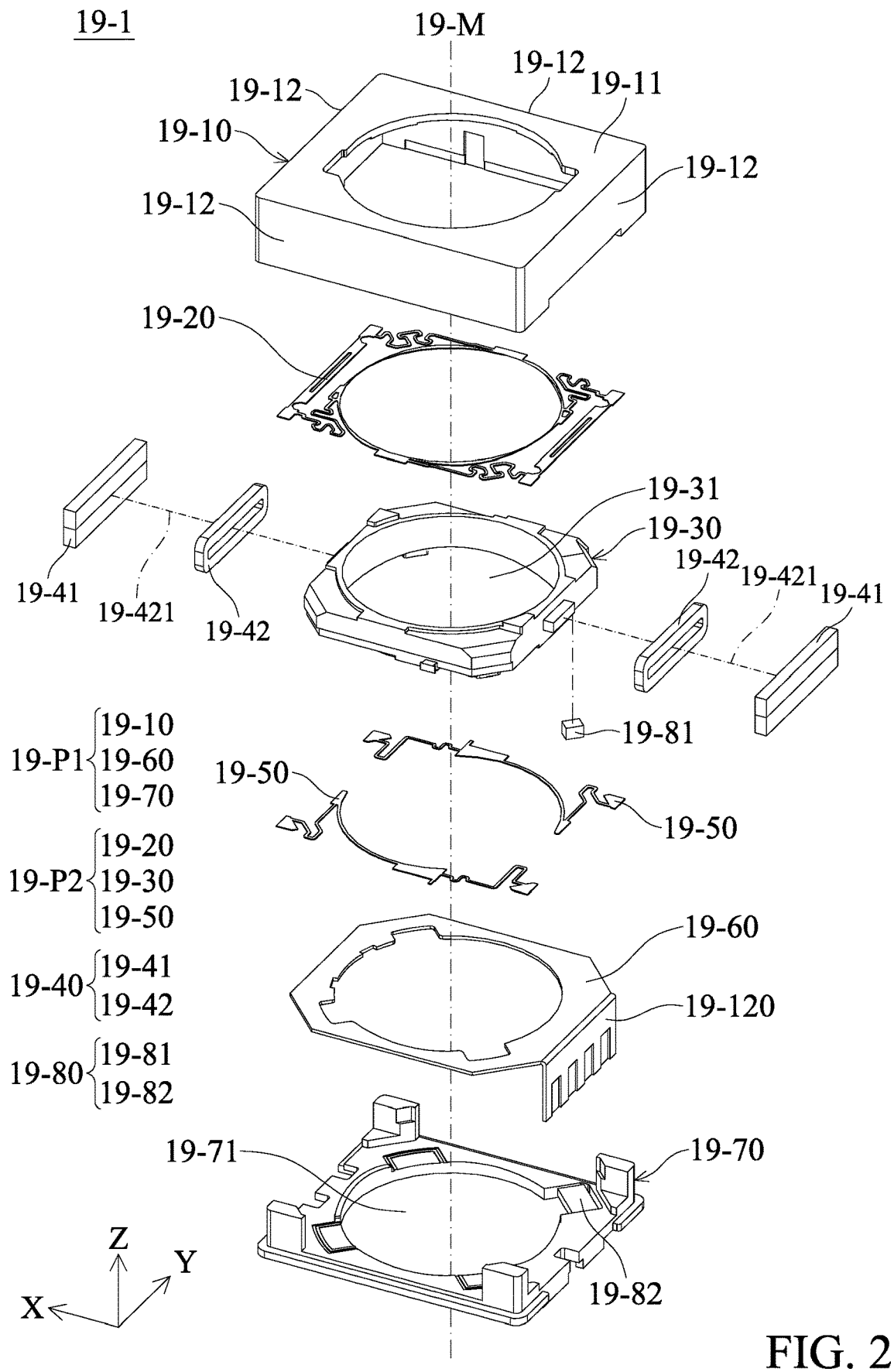
FIG. 2 is an exploded view of the optical element driving mechanism in FIG. 1.

FIG. 1 is a perspective view of an optical element driving mechanism 19-1 and an optical element 19-2 in accordance with some embodiments of this disclosure. When an electronic device (e.g. a smart phone) is provided with the optical element driving mechanism 19-1, the optical element driving mechanism 19-1 may be disposed in the front of the smart phone as a front lens along with the optical element 19-2. The optical element 19-2 has an optical axis 19-O. The optical axis 19-O is an imaginary axis passing through the center of the optical element 19-2. FIG. 2 is an exploded view of the optical element driving mechanism 19-1 in FIG. 1. The optical element driving mechanism 19-1 includes a fixed part 19-P1, a movable part 19-P2, a driving assembly 19-40, and a sensing assembly 19-80. The movable part 19-P2 moves relative to the fixed part 19-P1. The movable part 19-P2 may hold the optical element 19-2. The driving assembly 19-40 drives the movable part 19-P2 to move relative to the fixed part 19-P1. The sensing assembly 19-80 senses the movement of the movable part 19-P2 relative to the fixed part 19-P1.

The fixed part 19-P1 has a main axis 19-M. The main axis 19-M passes through the center of the optical element driving mechanism 19-1. It should be noted that when the optical element 19-2, the optical element driving mechanism 19-1 and a light-detection element (not shown) (e.g. a charge-coupled detector, CCD) are aligned, the optical axis 19-O of the optical element 19-2 also passes through the center of the optical element driving mechanism 19-1 so that the optical axis 19-O of the optical element 19-2 coincides with the main axis 19-M of the fixed part 19-P1. However, movement, vibration, or tilt of the movable part 19-P2 may cause the optical axis 19-O of the optical element 19-2 not coincide with the main axis 19-M of the fixed part 19-P1 because the optical element 19-2 is disposed in the movable part 19-P2.

In this embodiment, the fixed part 19-P1 includes a case 19-10, a circuit assembly 19-60, and a bottom 19-70. The movable part 19-P2 includes a first elastic element 19-20, a holder 19-30, and two second elastic elements 19-50. The driving assembly 19-40 includes two magnetic elements 19-41 and two coils 19-42. The sensing assembly 19-80 includes a sensed object 19-81 and a sensor 19-82. It should be noted that the elements may be added or omitted according with the requirements of the users.

The case 19-10, the circuit assembly 19-60, and the bottom 19-70 of the fixed part 19-P1 are arranged sequentially along the main axis 19-M. The case 19-10 is located over the circuit assembly 19-60 and the bottom 19-70. The case 19-10 may be made of metal material or non-metal material such as plastics. The case 19-10 made of non-metal material may isolate electromagnetic wave. In this way, the electromagnetic wave interference generated by an antenna close to the optical element driving mechanism 19-1 may be reduced.

The case 19-10 includes a top surface 19-11 and four sidewalls 19-12 extending from the edge of the top surface 19-11 along the main axis 19-M. The bottom 19-70 has an opening 19-71. The sidewalls 19-12 of the case 19-10 are connected to the bottom 19-70 and the space formed therein may accommodate the movable part 19-P2, the driving assembly 19-40, and the sensing assembly 19-80, and the like.

The circuit assembly 19-60 is disposed on the bottom 19-70. The circuit assembly 19-60 may be a circuit board such as a flexible print circuit (FPC) or a flexible-hard composite board. The circuit assembly 19-60 is connected to an outside-connection circuit member 19-120. The current may be supplied to the optical element driving mechanism 19-1 via the outside-connection circuit member 19-120.

How the current flows through the optical element driving mechanism 19-1 is described in detail in the following content.

The first elastic element 19-20, the holder 19-30, and the second elastic elements 19-50 of the movable part 19-P2 are arranged along the main axis 19-M sequentially. The holder 19-30 has a through hole 19-31 for holding the optical element 19-2. A screw and its corresponding threaded structure may be configured between the through hole 19-31 and the optical element 19-2, so that the optical element 19-2 may be affixed in the holder 19-30.

The first elastic element 19-20 and the second elastic elements 19-50 may be made of metal material. The holder 19-30 may be movably connected to the case 19-10 and the bottom 19-70 by being held elastically by the first elastic element 19-20 and the second elastic elements 19-50. Held between the first elastic element 19-20 and the second elastic elements 19-50, the holder 19-30 is not in direct contact with the case 19-10 and the bottom 19-70. Additionally, the range of motion of the holder 19-30 is also restricted to avoid the holder 19-30 and the optical element 19-2 therein get damaged because of collision with the case 19-10 or the bottom 19-70 when the optical element driving mechanism 19-1 moves or is impacted.

The position of each of the magnetic elements 19-41 of the driving assembly 19-40 corresponds to the position of each of the coils 19-42 of the driving assembly 19-40. The magnetic elements 19-41 and the coils 19-42 are disposed close to the holder 19-30. The magnetic elements 19-41 may be permanent magnets. The arrangement direction of the pair of magnetic poles (N-pole and S-pole) of the magnetic elements 19-41 is parallel to the main axis 19-M. The magnetic elements 19-41 and the coil 19-42 are substantially rectangular. The long side of each of the magnetic elements 19-41 corresponds to the long side of each of the coils 19-42. When the current is supplied to the coils 19-42, magnetic force may be generated between the magnetic elements 19-41 and the coils 19-42 for driving the holder 19-30 and the optical element 19-2 therein to move along the optical axis 19-O. Each of the coils 19-42 has a winding axis 19-421 that is perpendicular to the main axis 19-M and parallel to the plane on which the circuit assembly 19-60 is located. Compared to the configuration of the winding axis 19-421 that is parallel to the main axis 19-M, the configuration of the coils 19-42 in this embodiment may reduce the size of the optical element driving mechanism 19-1 in a direction that is perpendicular to the main axis 19-M. Furthermore, when viewed along the main axis 19-M, the driving assembly 19-40 partially overlaps the circuit assembly 19-60, which may also reduce the size of the optical element driving mechanism 19-1 in a direction that is perpendicular to the main axis 19-M.

Figure 3:
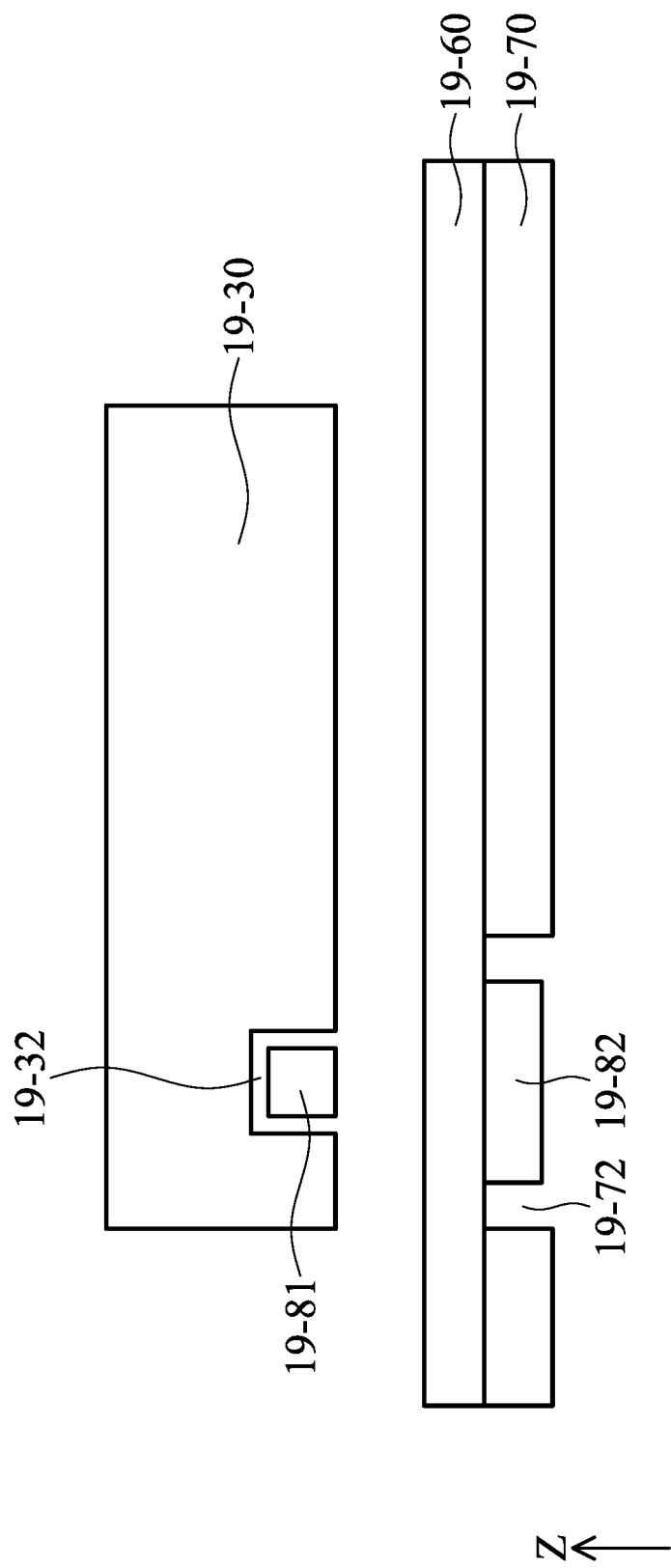
FIG. 3 is a schematic view of the optical element driving mechanism.

The position of the sensed object 19-81 of the sensing assembly 19-80 corresponds to the position of the sensor 19-82 of the sensing assembly 19-80. Please refer to FIG. 3 first. FIG. 3 is a schematic view of the optical element driving mechanism 19-1. The sensed object 19-81 is disposed close to the holder 19-30. The holder 19-30 includes a receiving space 19-32 for receiving the sensed object 19-81. The sensor 19-82 is disposed on the bottom 19-70. Particularly, the sensor 19-82 is mounted to the surface of the circuit assembly 19-60 that faces the bottom 19-70 by surface mount technology (SMT) and the like. The bottom 19-70 includes a receiving portion 19-72 for receiving the sensor 19-82. The receiving portion 19-72 may penetrate through (e.g. as a through hole) or may not penetrate through (e.g. as a recess) the bottom 19-70. Therefore, the circuit assembly 19-60 is disposed between the holder 19-30 and the sensor 19-82. The sensed object 19-81 may be a magnetic element such as a magnet. The sensor 19-82 may be a giant magneto resistance (GMR) sensor, a tunneling magneto resistance (TMR) sensor, and the like. When the holder 19-30 moves, the sensed object 19-81 close to the holder 19-30 also moves, and thus the magnetic field of the sensed object 19-81 changes. The sensor 19-82 may sense the change of the magnetic field of the sensed object 19-81 in order to know the position of the holder 19-30 and adjust the position of the holder 19-30, achieving the effects of controlling the movement of the holder 19-30.

Figure 4:
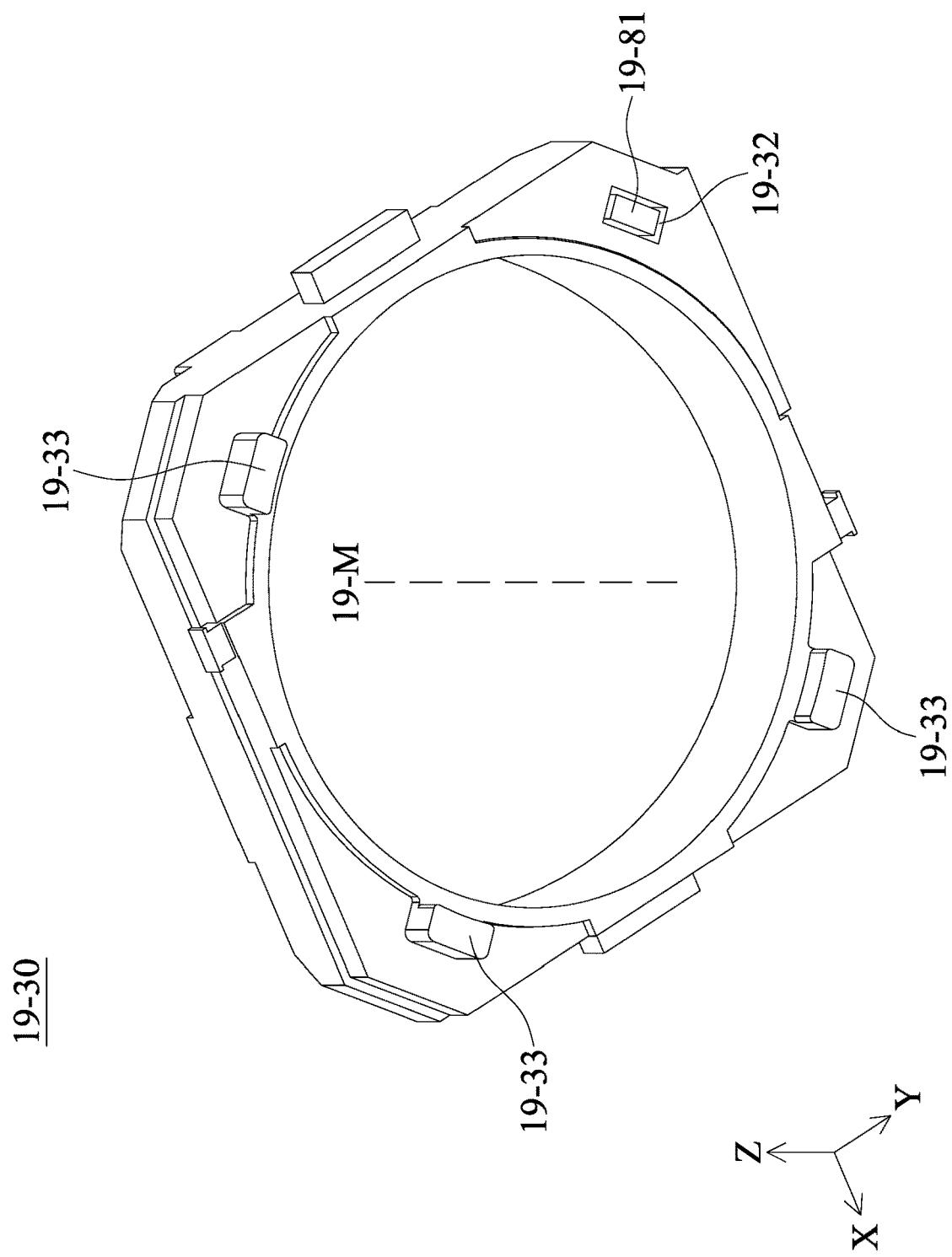
FIG. 4 is a perspective view of a holder.
Figure 5:
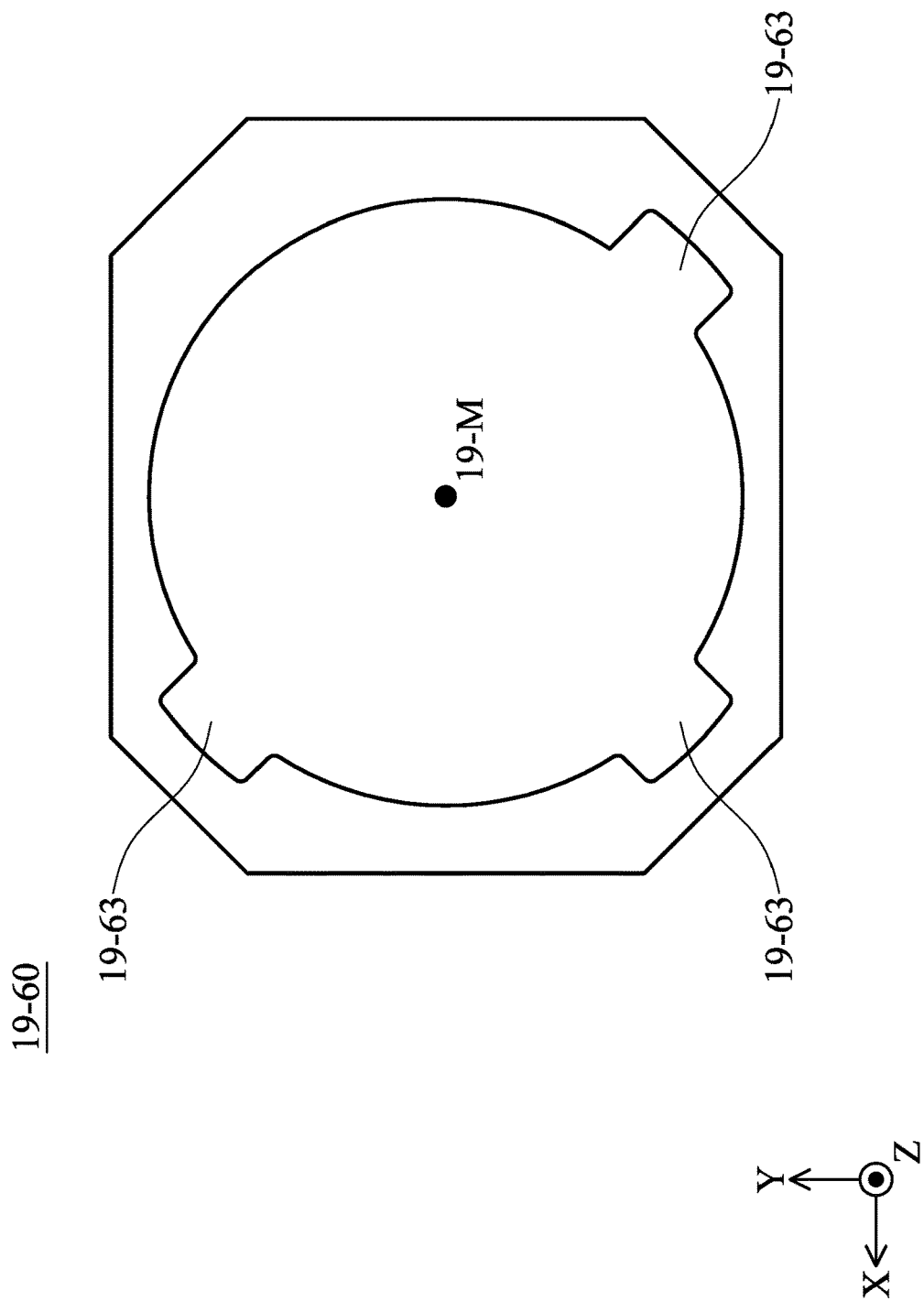
FIG. 5 is a top view of a circuit assembly.
Figure 6:
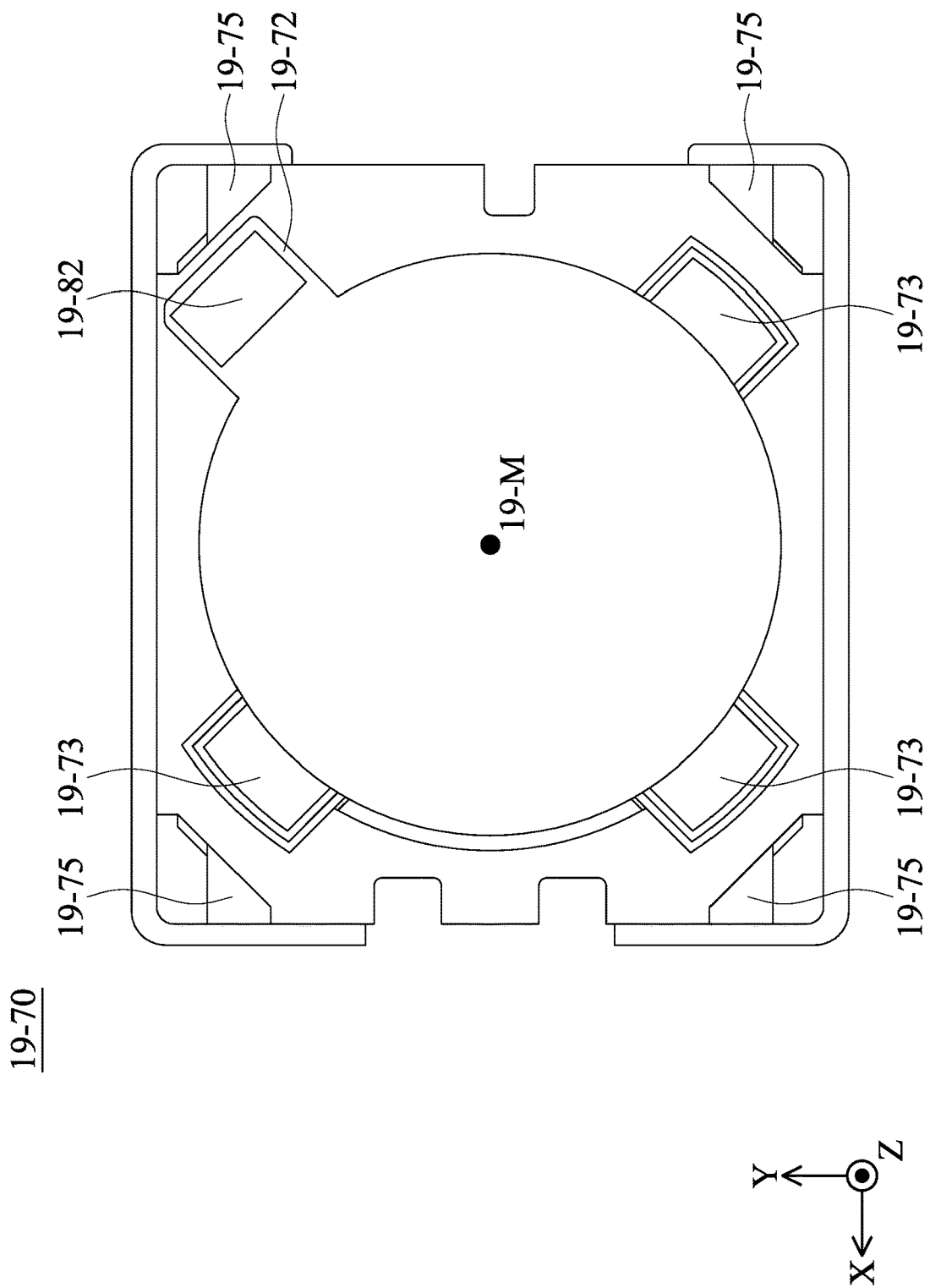
FIG. 6 is a top view of a bottom.
Figure 7:
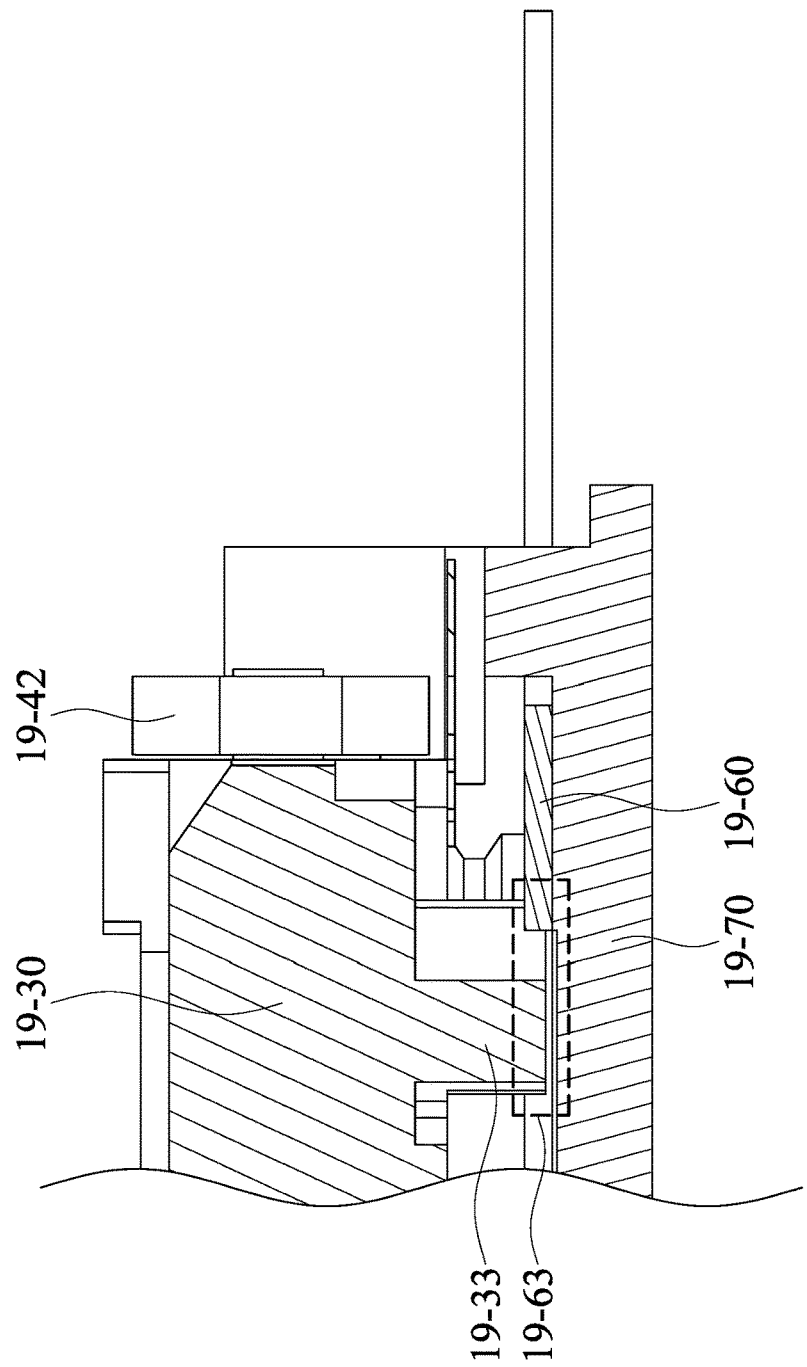
FIG. 7 is a cross-sectional view of a portion of the optical element driving mechanism.

Next, please refer to FIG. 4 to FIG. 7. FIG. 4 is a perspective view of the holder 19-30. FIG. 5 is a top view of the circuit assembly 19-60. FIG. 6 is a top view of the bottom 19-70. FIG. 7 is a cross-sectional view of a portion of the optical element driving mechanism 19-1.

As shown in FIG. 4, the holder 19-30 includes three stopping portions 19-33. The sensed object 19-81 is disposed on one of the corners of the holder 19-30, and the three stopping portions 19-33 of the holder 19-30 are disposed on the other three corners of the holder 19-30. As shown in FIG. 5, the circuit assembly 19-60 includes three concave portions 19-63. As shown in FIG. 6, the bottom 19-70 includes three recesses 19-73. When the holder 19-30, the circuit assembly 19-60, and the bottom 19-70 arranged in a stack, the sensed object 19-81 disposed on the holder 19-30 corresponds to the sensor 19-82 disposed on the bottom 19-70. The three stopping portions 19-33 correspond to the three concave portions 19-63 of the circuit assembly 19-60 and the three recesses 19-73 of the bottom 19-70.

The stopping portions 19-33 may restrict the range of motion of the holder 19-30 relative to the bottom 19-70. As shown in FIG. 7, when the holder 19-30 moves, the stopping portions 19-33 pass through the concave portions 19-63 of the circuit assembly 19-60 and are not blocked by the circuit assembly 19-60. Specifically, when the holder 19-30 moves toward the bottom 19-70, a portion of the stopping portions 19-33 is located in the concave portions 19-63. At the same time, when viewed along a direction that is perpendicular to the main axis 19-M, the stopping portions 19-33 partially overlap the circuit assembly 19-60.

When the driving assembly 19-40 drives the holder 19-30 to move along the optical axis 19-O and reach the limit, the stopping portions 19-33 contact the recesses 19-73 of the bottom 19-70, and thus the rest of the portions of the holder 19-30 cannot contact the bottom 19-70 so as to prevent the rest of the portions of the holder 19-30 from colliding with the bottom 19-70. Therefore, the holder 19-30 and the optical element 19-2 therein don't get damaged because the bottom 19-70 does not collide with bottom 19-70 thanks to the stopping portions 19-33.

Furthermore, the number and the positions of the stopping portions 19-33 may be adjusted. There may be one or more stopping portions 19-33. For example, in this embodiment, there are three stopping portions 19-33, so there are three contact areas between the three stopping portions 19-33 and the bottom 19-70. In such an embodiment, three contact areas may effectively attribute collision force and enhance the stability of the optical element driving mechanism 19-1. Additionally, in this embodiment, the stopping portions 19-33 are part of the holder 19-30 and the recesses 19-73 that are in contact with the stopping portions 19-33 are part of the bottom 19-70. However, the bottom 19-70 may include a stopping portion (not shown) to substitute the recesses 19-73, so that the stopping portions 19-33 of the holder 19-30 correspond to the stopping portion of the bottom 19-70. Alternatively, only one of the holder 19-30 and the bottom 19-70 includes one or more stopping portions. For example, the sensor 19-82 is disposed in one of the corners of the bottom 19-70 while the one or more stopping portions are disposed in the other corners of the bottom 19-70.

Additionally, as shown in FIG. 6, the bottom 19-70 includes four supporting platforms 19-75. The height of the supporting platforms 19-75 is higher than that of the rest of the portions of the bottom 19-70. That is, the supporting platforms 19-75 are closer to the top surface 19-11 of the case 19-10 than the rest of the portions of the bottom 19-70. When viewed along the main axis 19-M, the supporting platforms 19-75 do not overlap the sensor 19-82. The functions of the supporting platforms 19-75 will be described further in the following content.

Figure 8:
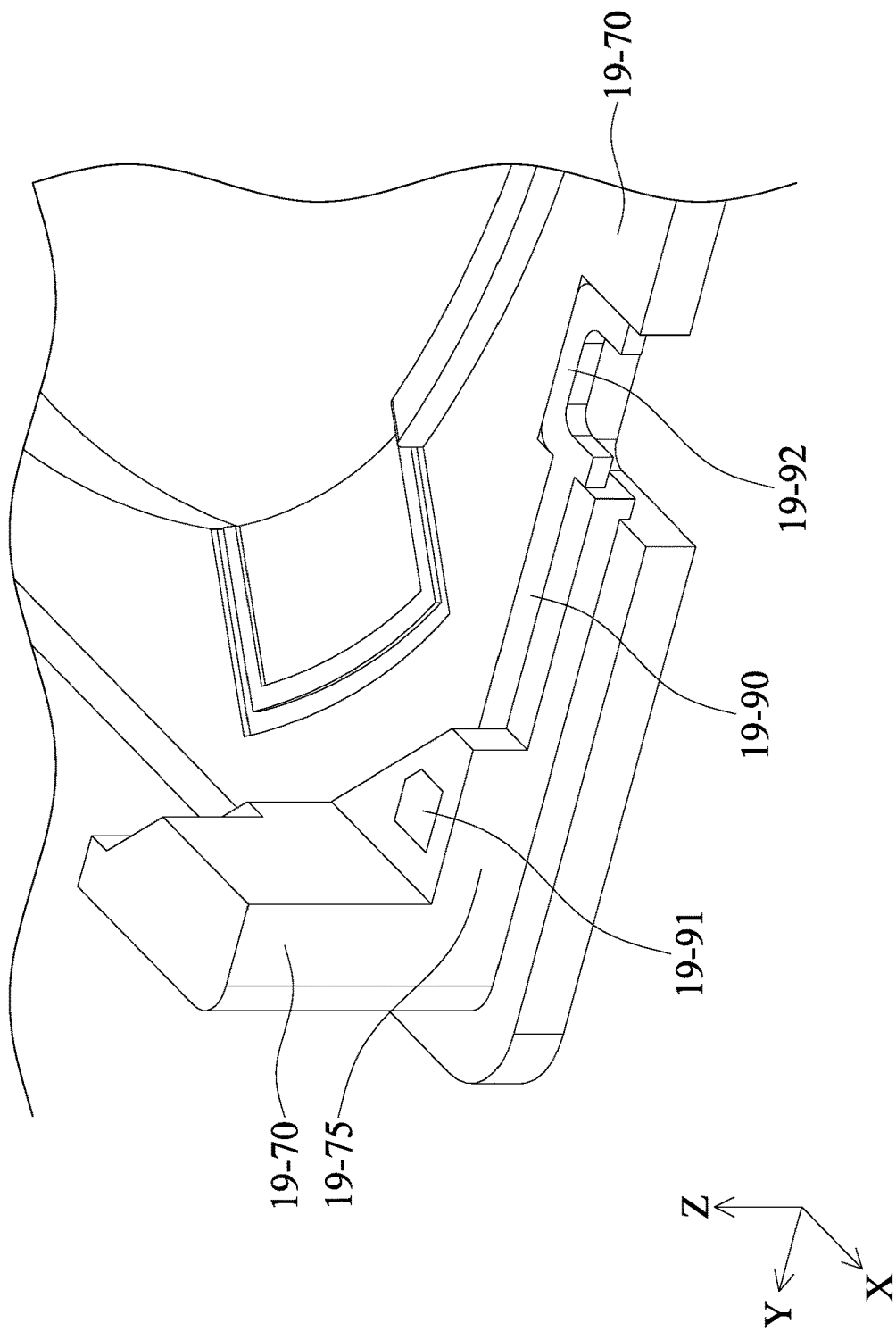
FIG. 8 is a perspective view of a portion of the bottom.

FIG. 8 is a perspective view of a portion of the bottom 19-70. In the following drawings, only one of the supporting platforms 19-75 is shown. The optical element driving mechanism 19-1 further includes a loop member 19-90. A portion of the loop member 19-90 is embedded in the bottom 19-70 by insert molding and the like. The loop member 19-90 including a first electrical connection portion 19-91 and a second electrical connection portion 19-92 is used as the conduction wire of the bottom 19-70 to be electrically connected to other elements. As shown in FIG. 8, the first electrical connection portion 19-91 is revealed from the supporting platform 19-75 of the bottom 19-70.

Figure 9:
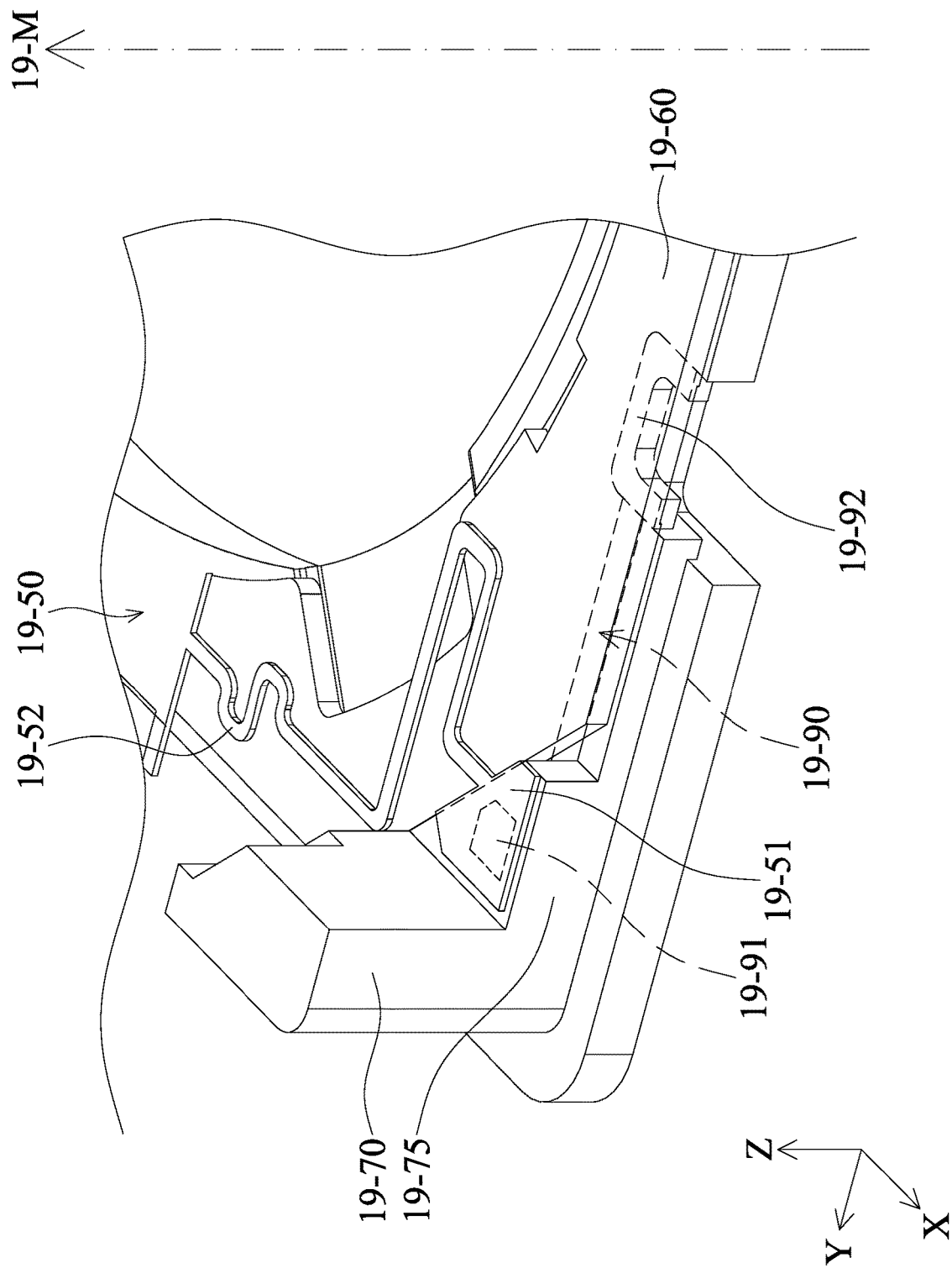
FIG. 9 is a perspective view of a portion of a second elastic element, the circuit assembly and the bottom.
Figure 10:
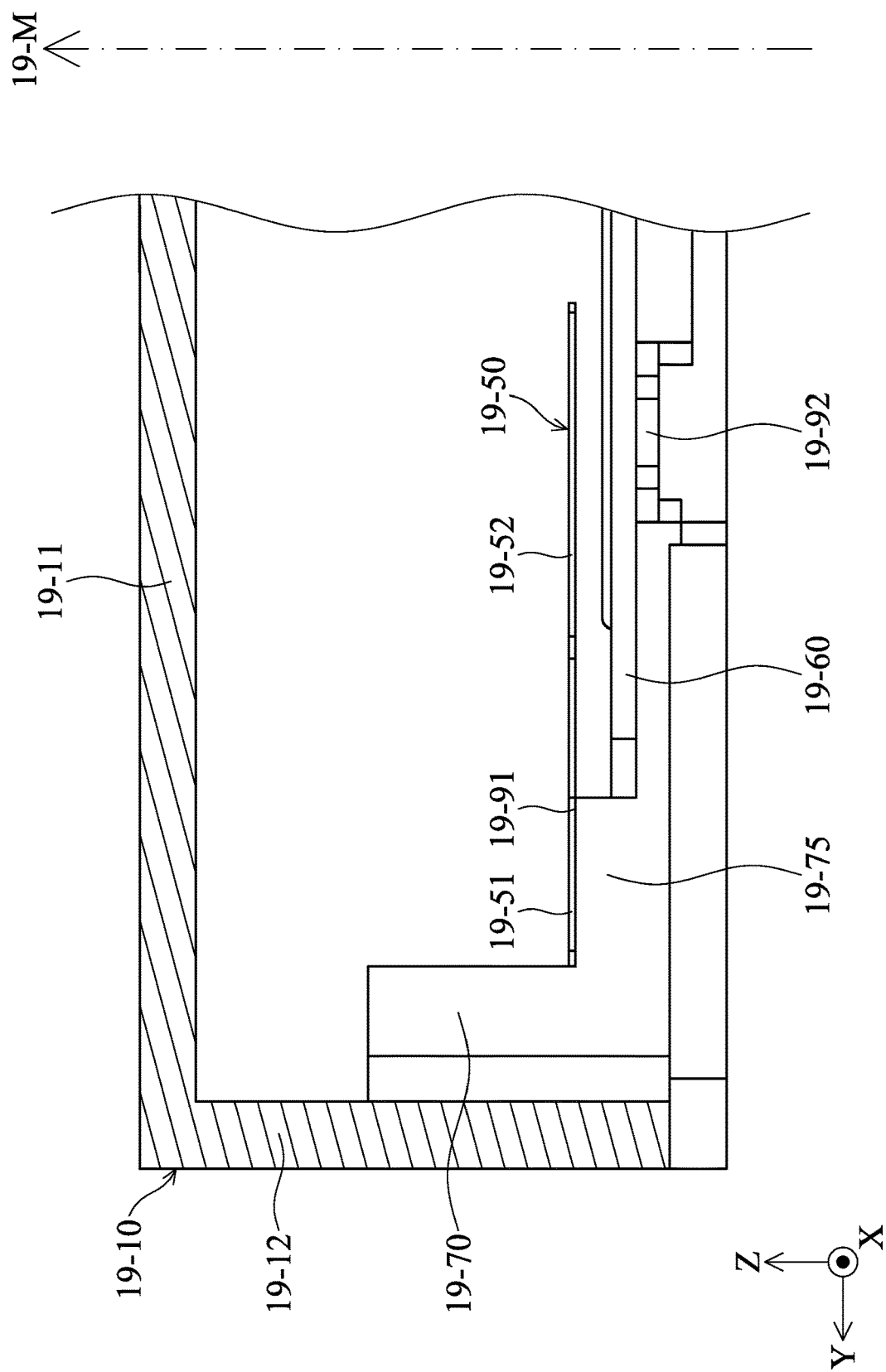
FIG. 10 is a schematic view of a portion of the optical element driving mechanism.

FIG. 9 is a perspective view of a portion of one of the second elastic elements 19-50, the circuit assembly 19-60 and the bottom 19-70. FIG. 10 is a schematic view of a portion of the optical element driving mechanism 19-1. FIG. 9 and FIG. 10 further illustrate the second elastic element 19-50 and the circuit assembly 19-60. As shown in FIG. 9, the second elastic element 19-50 includes a connection portion 19-51 and a deformation portion 19-52. The connection portion 19-51 is fixedly disposed on the supporting platform 19-75 of the bottom 19-70. Therefore, the deformation of the second elastic element 19-50 is mainly achieved by extending or shortening the deformation portion 19-52. Additionally, the deformation of the second elastic element 19-50 meets the target of holding the holder 19-30 elastically together with the first elastic element 19-20. The supporting platform 19-75 does not overlap the circuit assembly 19-60 when viewed along the main axis 19-M. Therefore, the first electrical connection portion 19-91 does not overlap the circuit assembly 19-60 when viewed along a direction that is perpendicular to the main axis 19-M, either.

As shown in FIG. 9 and FIG. 10, the loop member 19-90 is electrically connected to the second elastic element 19-50 at the first electrical connection portion 19-91 and electrically connected to the circuit assembly 19-60 at the second electrical connection portion 19-92. The distance between the first electrical connection portion 19-91 and the top surface 19-11 of the case 19-10 in the direction of the main axis 19-M is different than the distance between the second electrical connection portion 19-92 and the top surface 19-11 of the case 19-10 in the direction of the main axis 19-M. Furthermore, the height of the supporting platform 19-75 is higher than the circuit assembly 19-60. That is, the supporting platform 19-75 is closer to the top surface 19-11 of the case 19-10 in the direction of the main axis 19-M.

When the second elastic element 19-50 deforms, the second elastic element 19-50 does not contact the circuit assembly 19-60. It is because the connection portion 19-51 is disposed on the supporting platform 19-75 and the deformation portion 19-52 is spaced apart a distance from the circuit assembly 19-60. The problem of black spots on the images or video caused by the particle or debris generated by the collision of the elements is prevented by the existence of the supporting platform 19-75.

Figure 11:
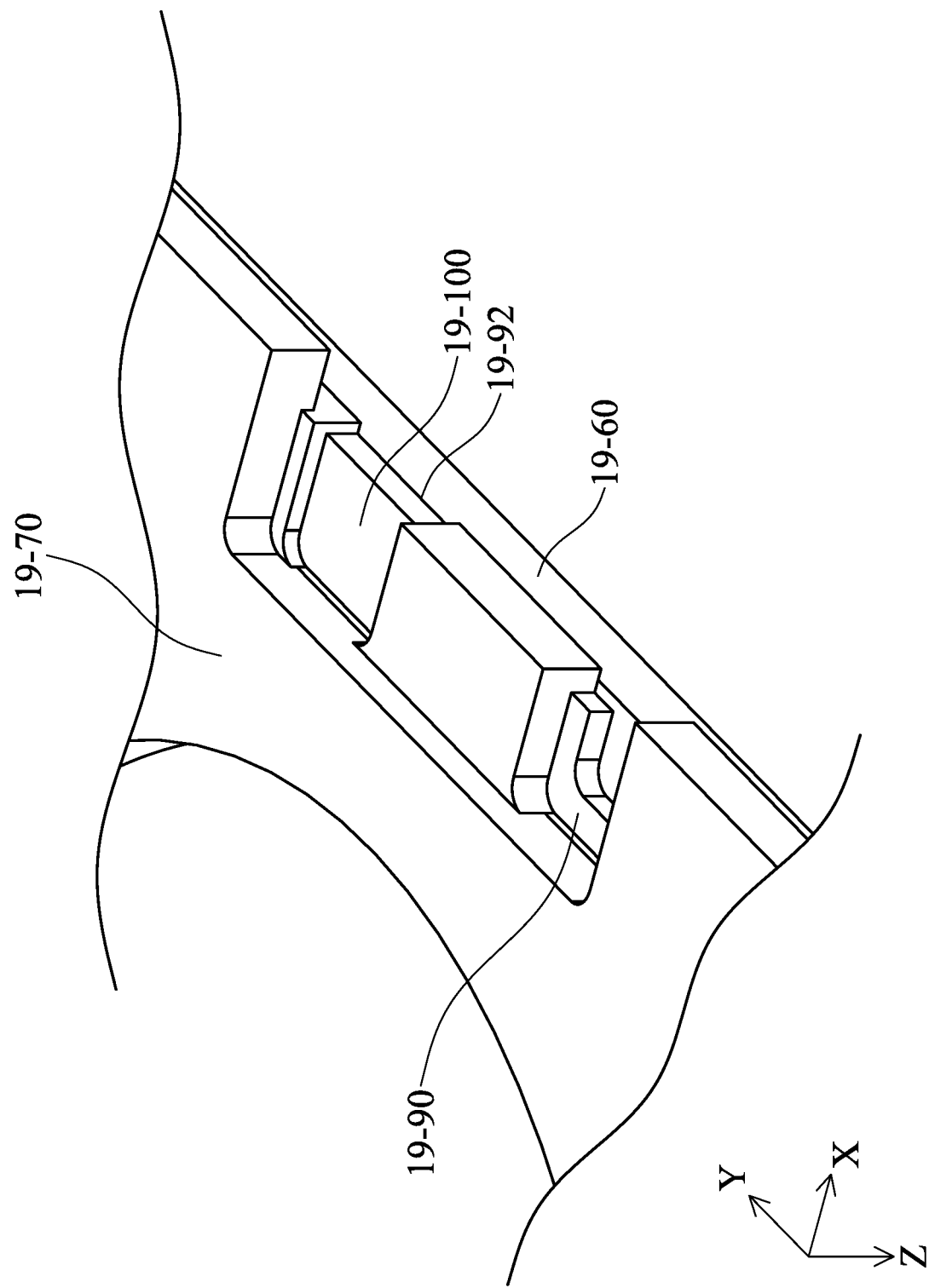
FIG. 11 and FIG. 12 are perspective views of a portion of the optical element driving mechanism.
Figure 12:
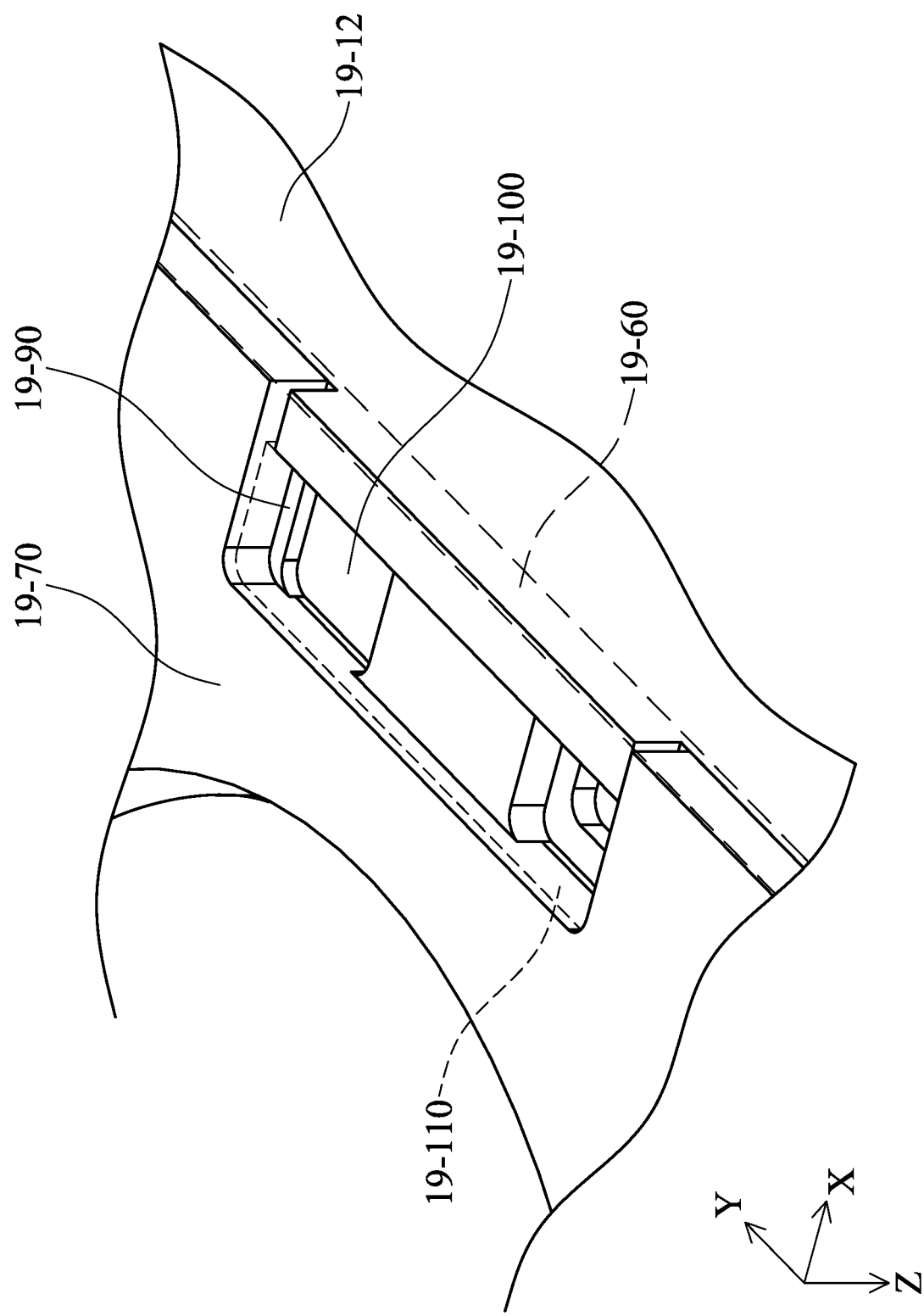

Next, how the loop member 19-90 is electrically connected to the circuit assembly 19-60 at the second electrical connection portion 19-92 will be described with reference to FIG. 11 and FIG. 12. FIG. 11 and FIG. 12 are perspective views of a portion of the optical element driving mechanism 19-1 illustrated in a different perspective. FIG. 11 and FIG. 12 show the optical element driving mechanism 19-1 from the bottom. The optical element driving mechanism 19-1 further includes an electrical connection piece 19-100. The electrical connection piece 19-100 may be any material (such as Tin) that may make any elements be electrically connected to other elements. A portion of the electrical connection piece 19-100 is disposed on the surface of the circuit assembly 19-60 which faces the bottom 19-70. The portion of the loop member 19-90 that revealed from the bottom surface of the bottom 19-70 is electrically connected to the circuit assembly 19-60 via the electrical connection piece 19-100. That is, the electrical connection piece 19-100 is disposed between the circuit assembly 19-60 and the bottom 19-70 to ensure the current passes through normally. In some embodiments, the electrical connection piece 19-100 may be omitted, and the circuit assembly 19-60 is electrically connected to the loop member 19-90 by any methods for making any elements be electrically connected to other elements such as fusion, application of conductive glue, and the like.

The optical element driving mechanism 19-1 may further include an adhesion element 19-110. Compared to FIG. 11, FIG. 12 further illustrates one of the sidewalls 19-12 of the case 19-10 and the adhesion element 19-110. When the case 19-10 is connected to the bottom 19-70, the sidewall 19-12 is close to a side of the electrical connection piece 19-100, so that the electrical connection piece 19-100 partially overlaps the sidewall 19-12 of the case 19-10 when viewed along a direction that is perpendicular to the main axis 19-M. The adhesion element 19-110 may be an adhesion material or an insulating material such as resin. The adhesion element 19-110 is disposed between the circuit assembly 19-60 and the bottom 19-70. Additionally, the adhesion element 19-110 directly contacts the surface of the circuit assembly 19-60 and the surface of the bottom 19-70. In some embodiments, the adhesion element 19-110 directly contacts the case 19-10 to strengthen the connection between the case 19-10 and the bottom 19-70.

As shown in FIG. 12, the adhesion element 19-110 directly contacts the electrical connection piece 19-100 and covers the electrical connection piece 19-100. Normally, the adhesion element 19-110 has good elasticity and good covering ability and thus the adhesion element 19-110 may protect the electrical connection piece 19-100, i.e. the position where the circuit assembly 19-60 is electrically connected to the loop member 19-90. Additionally, the adhesion element 19-110 may reduce the probability of particles such as dust or mist entering the optical element driving mechanism 19-1. If the adhesion element 19-110 is made of insulating material, insulation may be achieved. The steps for applying the adhesion element 19-110 is normally referred to as "glue dispensing", which may be conducted manually or mechanically.

Figure 13:
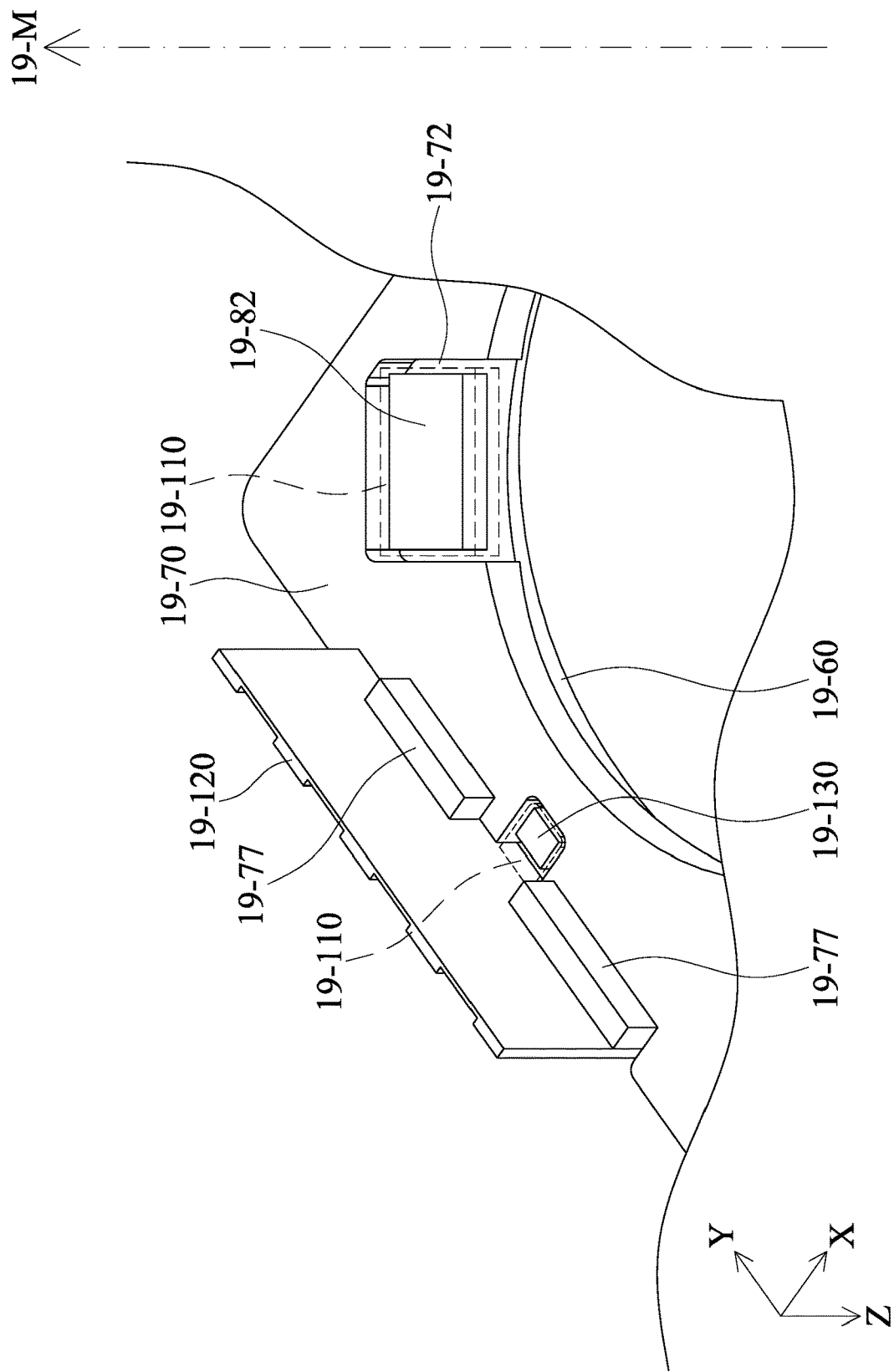
FIG. 13 is a schematic view of an outside-connection circuit member and an electronic element.

FIG. 13 is a perspective view of a portion of the bottom 19-70 illustrated in another different perspective to show the outside-connection circuit member 19-120 and an electronic element 19-130. The sensor 19-82 partially overlaps the bottom 19-70 when viewed along a direction that is perpendicular to the main axis 19-M. Additionally, the bottom surface of the bottom 19-70 is farther away from the top surface 19-11 of the case 19-10 than the bottom surface of the sensor 19-82 in the direction of the main axis 19-M, so that the receiving portion 19-72 may protect the sensor 19-82. In some embodiments, the size of the sensor 19-82 in the direction of the main axis 19-M is smaller than the receiving portion 19-72 of the bottom 19-70 in the direction of the main axis 19-M. Furthermore, the bottom surface of the bottom 19-70 is farther away from the top surface 19-11 of the case 19-10 than the bottom surface of the sensor 19-82. Furthermore, the sensor 19-82 is disposed in the receiving portion 19-72 and thus other spaces are not occupied, which is also advantageous for miniaturization of the optical element driving mechanism 19-1. Also, the adhesion element 19-110 may also be disposed in the receiving portion 19-72 to further strengthen the structure of the optical element driving mechanism 19-1. Under such circumstances, the adhesion element 19-110 directly contacts the sensor 19-82, the circuit assembly 19-60, and the bottom 19-70.

As shown in FIG. 13, the optical element driving mechanism 19-1 further includes the electronic element 19-130. The bottom 19-70 includes two baffles 19-77. The baffles 19-77 contact the outside-connection circuit member 19-120 to increase the structural strength. The electronic element 19-130 may be a capacitance, an inductance, a filter, an integrated circuit, and the like. The electronic element 19-130 is disposed on a side of the circuit assembly 19-60 which is close to the outside-connection circuit member 130. Similarly, the adhesion element 19-110 may also be disposed on the electronic element 19-130, so that the adhesion element 19-110 directly contacts the circuit assembly 19-60 and the electronic element 19-130.

As described above, the adhesion element 19-110 may adhere several elements to each other at the same time by only applying the adhesion element 19-110 (i.e. glue dispensing) one time. By such operation, the process is simplified, the production efficiency is enhanced, and the adhesion strength is increased.

Figure 14:
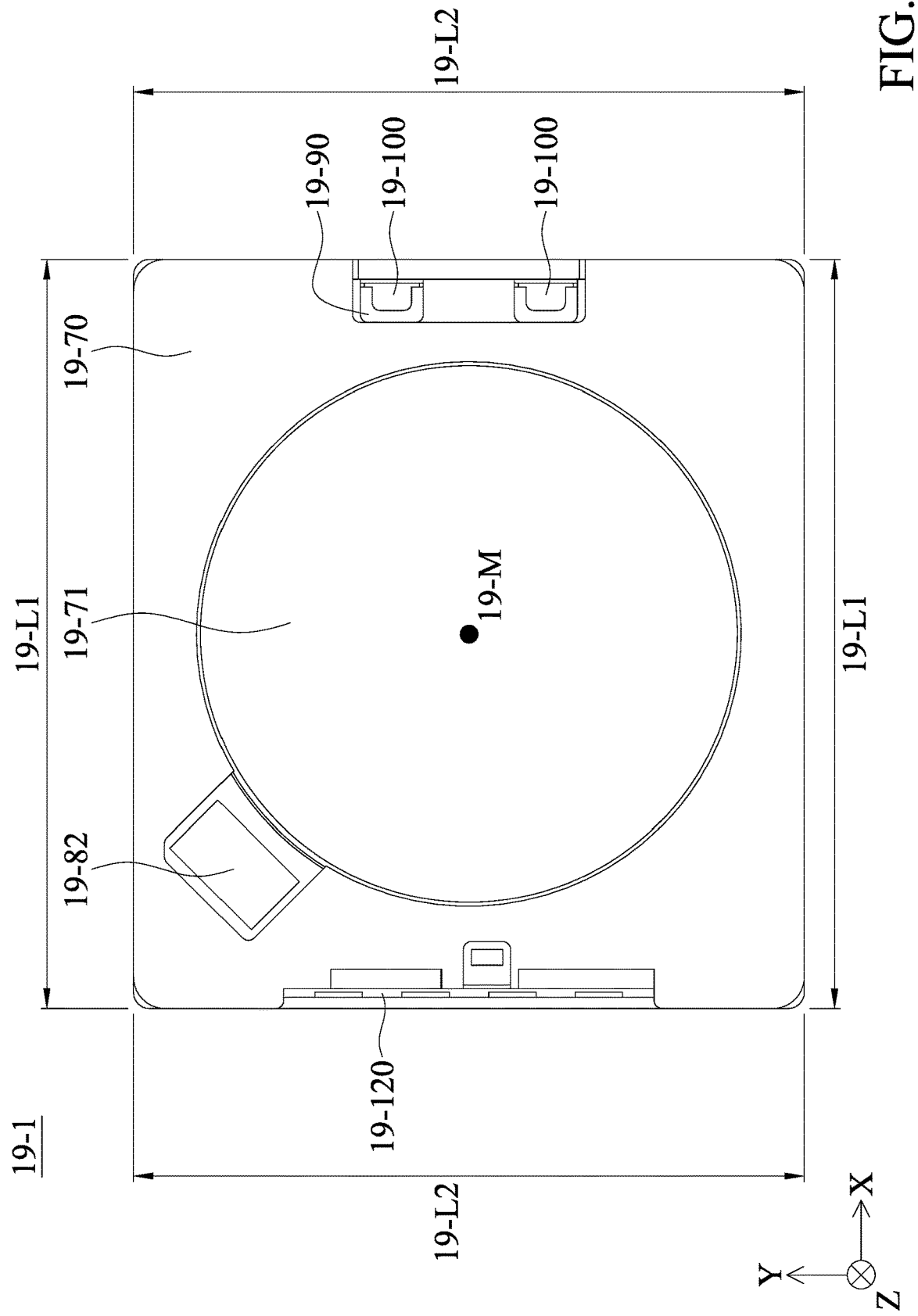
FIG. 14 is a bottom view of the optical element driving mechanism.

FIG. 14 is a bottom view of the optical element driving mechanism 19-1, which shows the whole bottom 19-70 while FIG. 11 to FIG. 13 only illustrate a portion of the bottom 19-70. As shown in FIG. 14, the bottom 19-70 is rectangular, including two opposite long sides 19-L1 and two opposite short sides 19-L2. For example, each of the long sides 19-L1 may be 9.5 mm, and each of the short sides 19-L2 may be 8.5 mm. The loop member 19-90 and the outside-connection circuit member 19-120 are respectively disposed on the two opposite short sides 19-L2 to avoid increasing the length of the long sides 19-L1 and enhance the usage of the space to achieve miniaturization.

Figure 15:
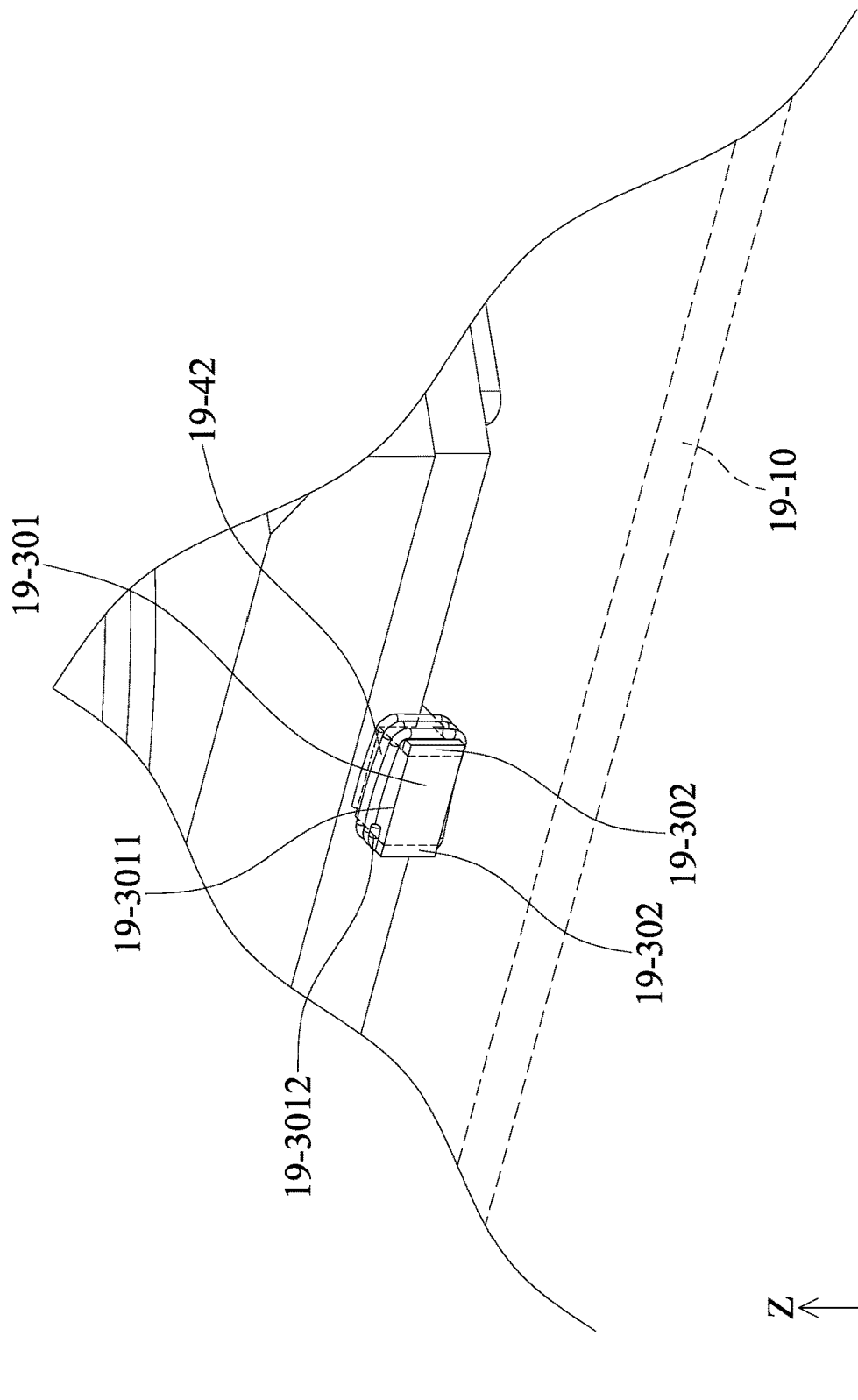
FIG. 15 is a perspective view of a portion of the holder.

FIG. 15 is a perspective view of a portion of the holder 19-30. The holder 19-30 includes two protrusions 19-301 located on opposite sides of the holder 19-30 and extends toward the sidewall 19-12 of the case 19-10. For simplicity, only one of the protrusions 19-301 and one of the coils 19-42 are shown here. A portion of the coil 19-42 surrounds the protrusion 19-301. For example, the lead extending from the coil 19-42 winds the protrusion 19-301, so that the coil 19-42 may be electrically connected to other elements. When viewed along the main axis 19-M, the top surface of protrusion 19-301 is rectangular including two opposite long sides 19-3011 and two opposite short sides 19-3012. Also, when viewed along a direction that is perpendicular to the main axis 19-M, the cross-section of the protrusion 19-301 is also rectangular, and the ratio of the long side of the cross-section of the protrusion 19-301 to the short side of the cross-section of the protrusion 19-301 is between about 1.5 to about 3.0. If the ratio of the long side of the cross-section of the protrusion 19-301 to the short side of the cross-section of the protrusion 19-301 is less than 1.5, for example, the ratio of the long side of the cross-section of the protrusion 19-301 to the short side of the cross-section of the protrusion 19-301 is 1.0 and thus the cross-section of protrusion 19-301 is square-shaped, the lead may drop off the protrusion 19-301 because the lead may rotate easily. If the ratio of the long side of the cross-section of the protrusion 19-301 to the short side of the cross-section of the protrusion 19-301 is greater than 3.0, then the protrusion 19-301 may be too big and be disadvantageous for miniaturization of the optical element driving mechanism 19-1.

To prevent the lead from dropping off, the protrusion 19-301 further includes two projections 19-302 disposed on the edge of the protrusion 19-301. Particularly, the projections 19-302 are disposed on the short side of the rectangular top surface of the protrusion 19-301. That is, when viewed from the extending direction of the protrusion 19-301, the projections 19-302 are disposed on the short sides 19-3012 of the protrusion 19-301. However, there may be only one projection 19-302, or, the projections 19-302 may be omitted. When viewed along the main axis 19-M, the profile of the protrusion 19-301 and the projections 19-302 is substantially T-shaped.

Figure 16:
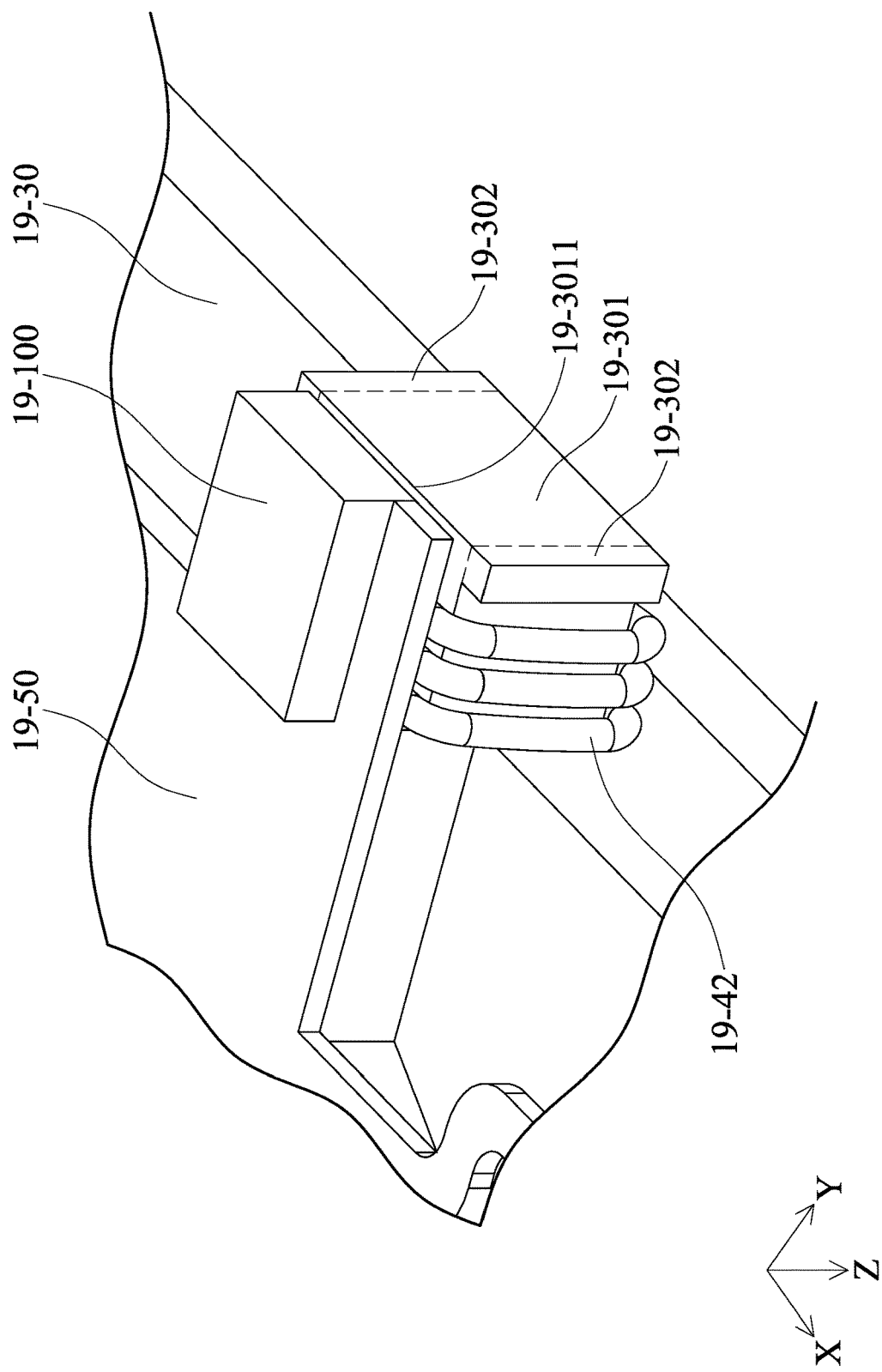
FIG. 16 is a perspective view of a portion of the holder and the second elastic element.

FIG. 16 is a perspective view of a portion of the holder 19-30 and the second elastic element 19-50. A portion of the second elastic element 19-50 is disposed on the top surface of the protrusion 19-301 and abuts the edge of the protrusion 19-301. Particularly, the second elastic element 19-50 abuts the long side of the rectangular top surface of the protrusion 19-301. That is, when viewed from the extending direction of the protrusion 19-301, a portion of the second elastic element 19-50 is disposed on the long side 19-3011 of the protrusion 19-301, so the second elastic element 19-50 may have greater mechanical strength. The electrical connection piece 19-100 may be disposed on the top surface of the protrusion 19-301, so that the coil 19-42 is electrically connected to the second elastic element 19-50.

How the current passes through the optical element driving mechanism 19-1 is described in detail herein. The outside-connection circuit member 19-120 is connected to a power supply (not shown) outside the optical element driving mechanism 19-1. The outside-connection circuit member 19-120 includes several pins for the current to flow in or flow out. The direction of the current is controlled according to the desired movement direction for correction, for example, whether the holder 19-30 moves toward or away from the bottom 19-70.

The current first flows through the circuit in the circuit assembly 19-60 that connects to the outside-connection circuit member 19-120 and flows through the sensor 19-82 disposed in the circuit assembly 19-60. Next, the current flows to the loop member 19-90 via the second electrical connection portion 19-92, and then the current flows to the second elastic element 19-50 via the first electrical connection portion 19-91. As shown in FIG. 16, the second elastic element 19-50 is electrically connected to the coil 19-42 at the protrusion 19-301 of the holder 19-30. Therefore, the current flows to the coils 19-42 so as to generate electromagnetic force with the magnetic elements 19-41. Next, the current flows to the protrusion 19-301 on the opposite side, and flows through the coil 19-42 on the opposite side, the second elastic element 19-50, the loop member 19-90, the circuit assembly 19-60, and the outside-connection circuit member 19-120 consecutively. Finally, the current flows out the optical element driving mechanism 19-1. To sum up, the outside-connection circuit member 19-120 is electrically connected to the sensor 19-82 via the circuit assembly 19-60. Also, the sensor 19-82 is electrically connected to the driving assembly 19-40 via the current that consecutively flows through the circuit assembly 19-60, the loop member 19-90, and the second elastic element 19-50.

Next, some other different embodiments will be described. Additionally, the same elements are denoted by the same symbols, similar elements are denoted by similar symbols, and related contents are not repeated.

Figure 17:
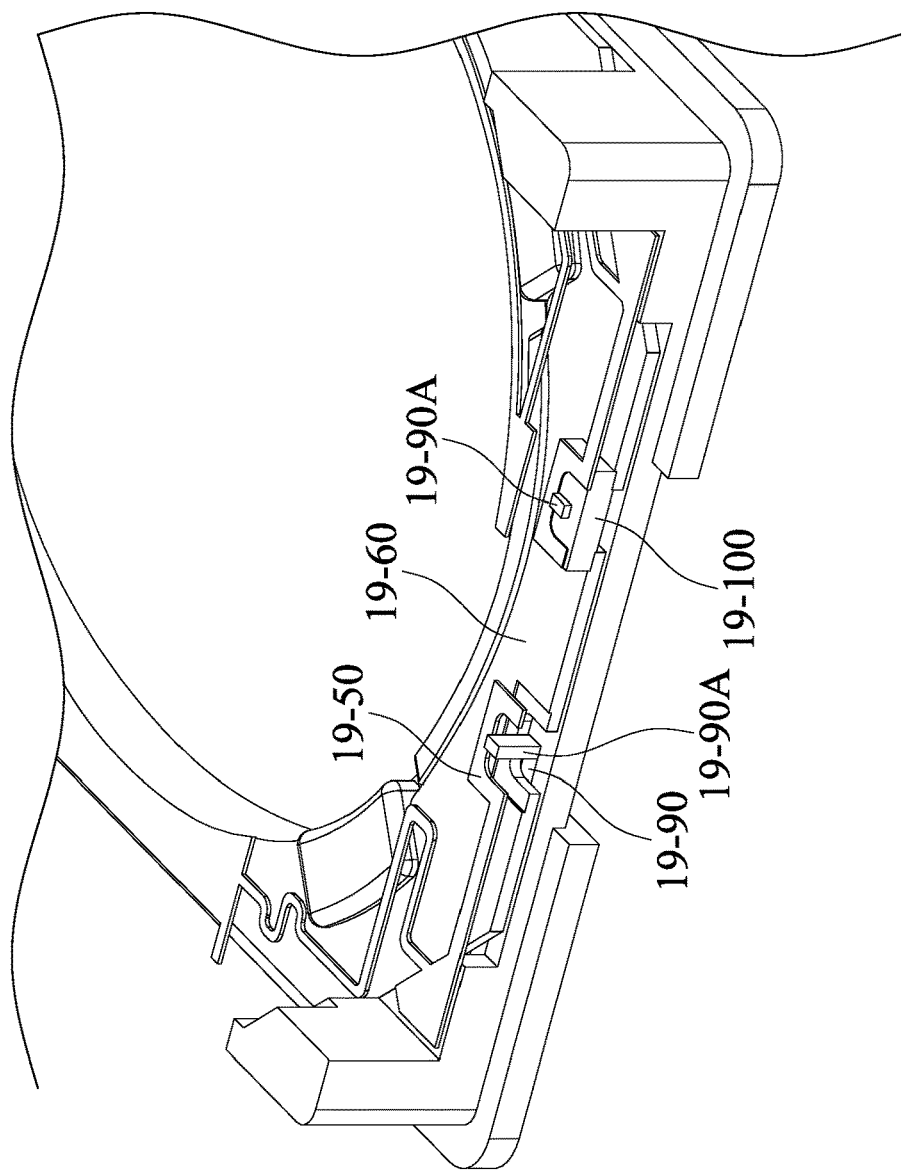
FIG. 17 is perspective view of an optical element driving mechanism in accordance with some other embodiments of this disclosure.

FIG. 17 is perspective view of a portion of an optical element driving mechanism 19-1A in accordance with some other embodiments of this disclosure. The difference between the optical element driving mechanism 19-1A and the optical element driving mechanism 19-1 is that the loop member 19-90 of the optical element driving mechanism 19-1A includes at least one projecting portion 19-90A corresponding to the second elastic element 19-50 and the circuit assembly 19-60 at the same time. Under such circumstances, the electrical connection piece 19-100 directly contacts the second elastic element 19-50, the circuit assembly 19-60, and the loop member 19-90 to make aforementioned elements be electrically connected to each other by only applying the electrical connection piece 19-100 (e.g. Tin welding) one time without applying the electrical connection piece 19-100 more than one time at different positions respectively (such as the first electrical connection portion 19-91 and the second electrical connection portion 19-92 as shown in FIG. 10). Therefore, the process is simplified and the production efficiency is enhanced. For the convenience of illustration, there are two projecting portions 19-90A in FIG. 17, but only one electrical connection piece 19-100 is shown.

Figure 18:
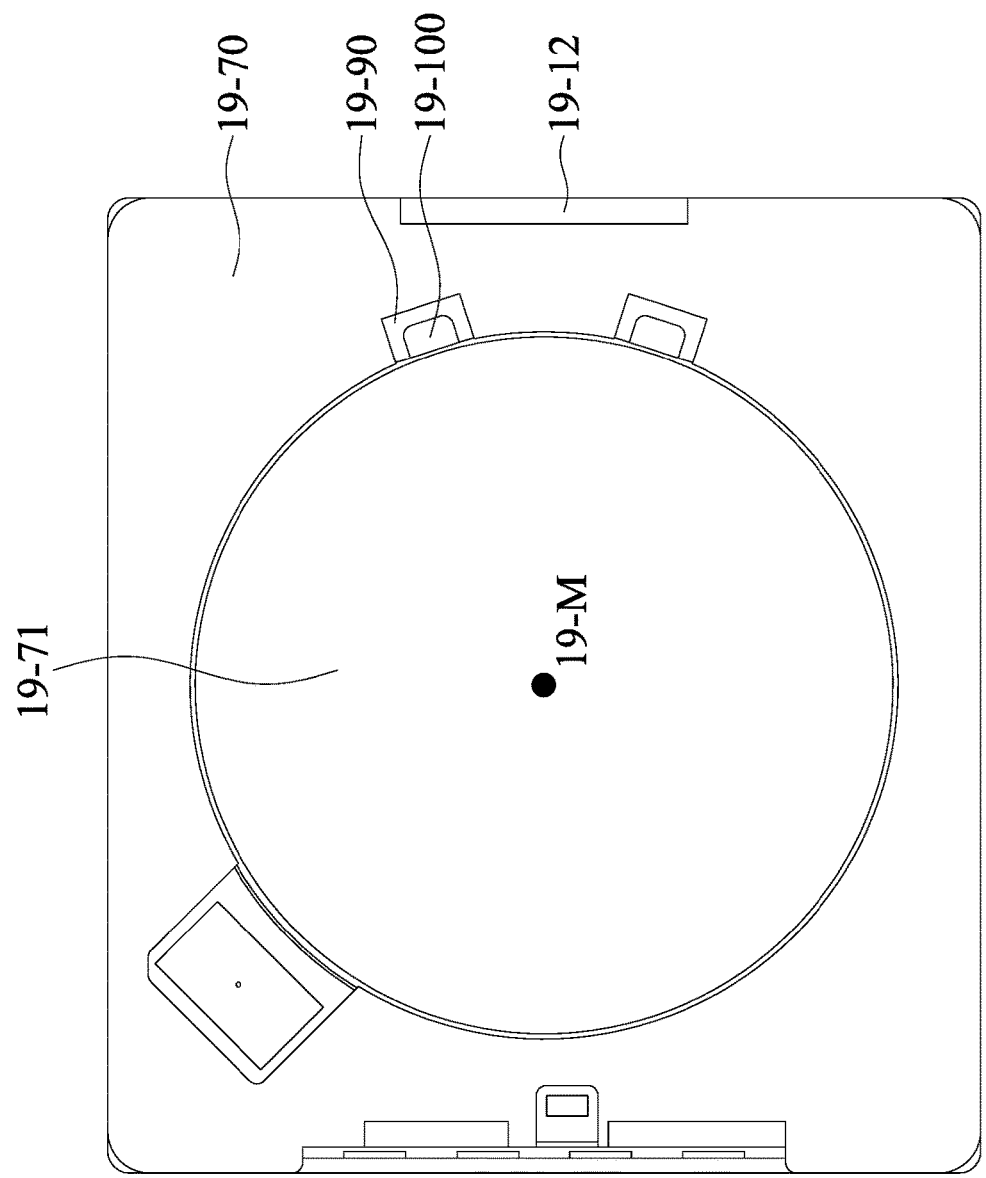
FIG. 18 is a bottom view of an optical element driving mechanism in accordance with some other embodiments of this disclosure.

FIG. 18 is a bottom view of an optical element driving mechanism 19-1B in accordance with some other embodiments of this disclosure. Please also refer to FIG. 14 in order to understand the difference between the optical element driving mechanism 19-1B and the optical element driving mechanism 19-1. The difference between the optical element driving mechanism 19-1B and the optical element driving mechanism 19-1 is that the loop member 19-90 is electrically connected to the circuit assembly 19-60 at the position that is close to the opening 19-71 of the bottom 19-70. Therefore, the electrical connection piece 19-100 is disposed on the edge of the opening 19-71 of the bottom 19-70, and a portion of the bottom 19-70 is located between the electrical connection piece 19-100 and the sidewall 19-12 of the case 19-10. When the case 19-10 is made of metal, short cut caused by the contact between the electrical connection piece 19-100 and the sidewall 19-12 of the case 19-10 is prevented by such configuration. In other words, the position where the loop member 19-90 is electrically connected to the circuit assembly 19-60 may be configured arbitrarily with regard to the factors such as the material of the case 19-10.

Figure 19:
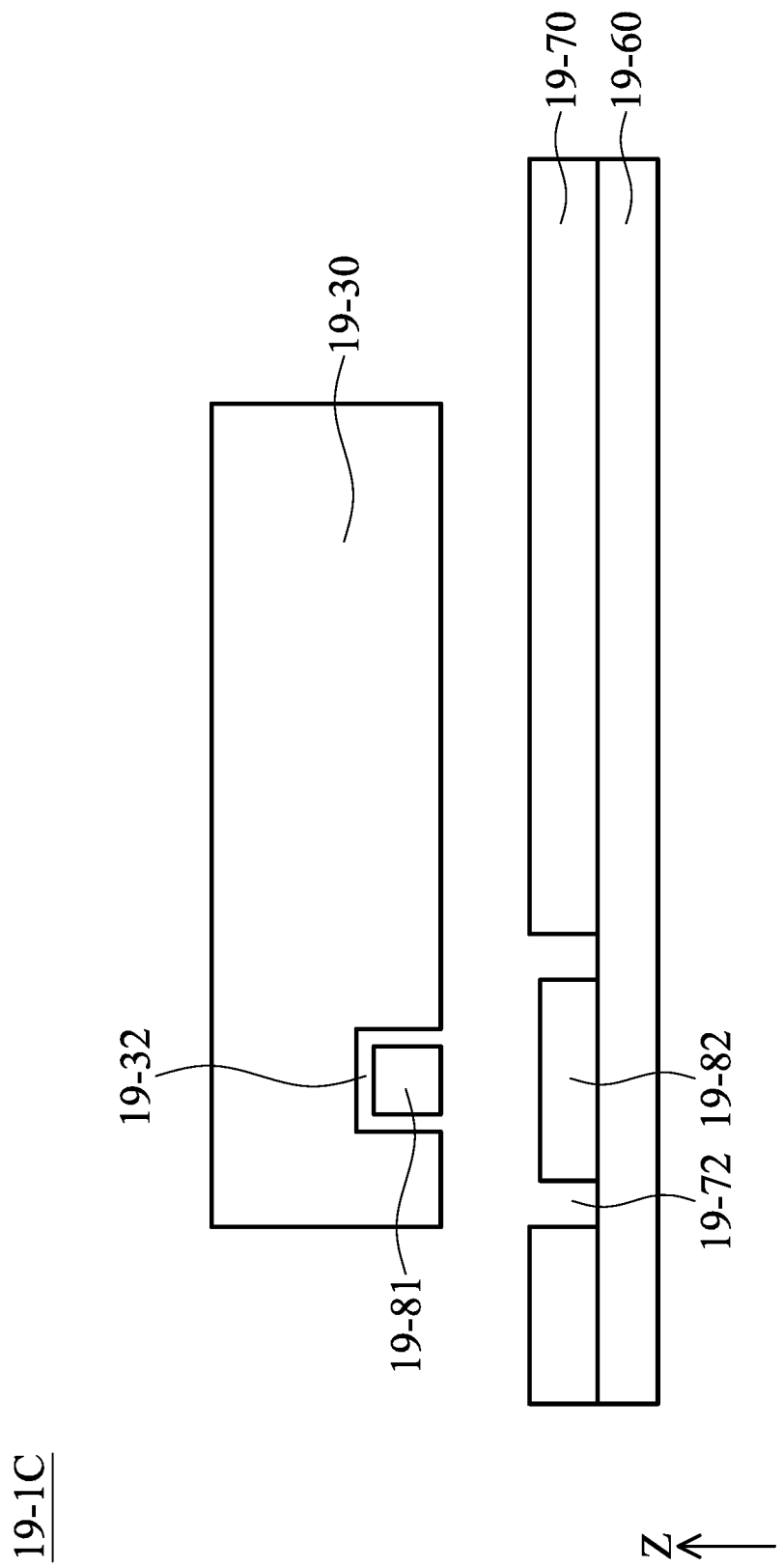
FIG. 19 is a schematic view of an optical element driving mechanism in accordance with some other embodiments of this disclosure.

FIG. 19 is a schematic view of an optical element driving mechanism 19-1C in accordance with some other embodiments of this disclosure. Please also refer to FIG. 3 in order to understand the difference between the optical element driving mechanism 19-1C and the optical element driving mechanism 19-1. In this embodiment, the circuit assembly 19-60 of the optical element driving mechanism 19-1C is disposed under the bottom 19-70. However, the sensor 19-82 is mounted on the surface of the circuit assembly 19-60 that faces the bottom 19-70 by SMT and the like. The sensor 19-82 is received in the receiving portion 19-72 of the bottom 19-70.

Figure 20:
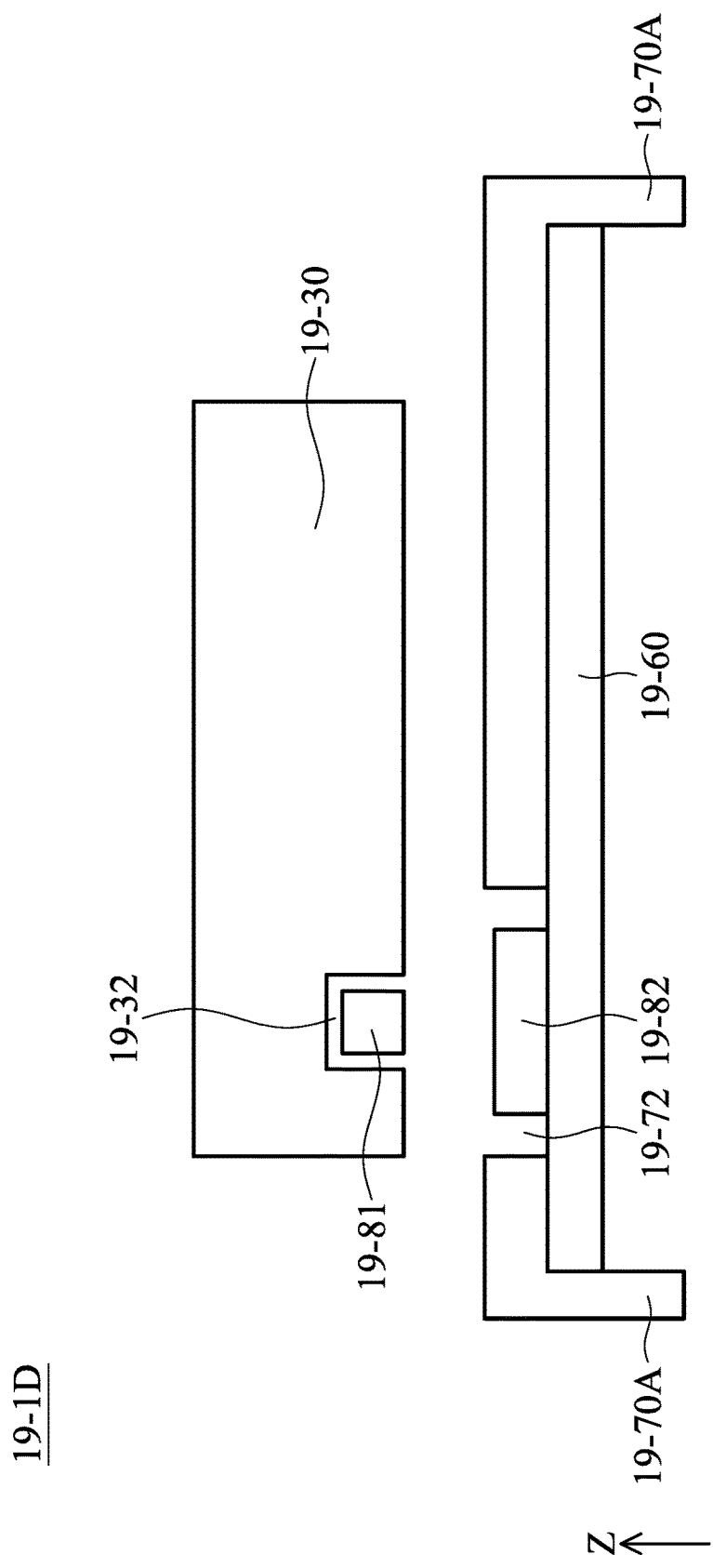
FIG. 20 is a schematic view of an optical element driving mechanism in accordance with some other embodiments of this disclosure.

FIG. 20 is a schematic view of an optical element driving mechanism 19-1D in accordance with some other embodiments of this disclosure. FIG. 20 is a variant of FIG. 19. In this embodiment, the bottom 19-70 of the optical element driving mechanism 19-1D further includes two extending portions 19-70A. The circuit assembly 19-60 is disposed between the spaces between the extending portions 19-70A to prevent the circuit assembly 19-60 from being damaged because the circuit assembly 19-60 contacts or collides with other elements.

As described above, an optical element driving mechanism is provided. The case may be made of metal material or non-metal material. When the case is made of metal, the electromagnetic wave interference may be isolated. The bottom is rectangular. The circuit assembly is disposed on the bottom to achieve miniaturization. The sensor is disposed on the circuit assembly to sense the sensed object and enhance the sensing accuracy. Furthermore, the bottom includes the corresponding receiving portion to protect the sensor.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
   a fixed part having a main axis, the fixed part comprising:
      a case; and
      a bottom, wherein the case and the bottom are arranged along the main axis;
   a movable part moving relative to the fixed part, wherein the movable part may hold an optical element with an optical axis;
   a driving assembly driving the movable part to move relative to the fixed part; and
   a sensing assembly sensing a movement condition of the movable part relative to the fixed part, the sensing assembly comprising:
      a sensor disposed on the bottom,
   wherein the driving assembly drives the movable part to move relative to the fixed part along a direction that is parallel to the optical axis, the fixed part further comprises a circuit assembly electrically connected to the sensing assembly, and when viewed along the main axis, the driving assembly partially overlaps the circuit assembly,
   wherein when viewed along a direction that is perpendicular to the main axis, the sensor partially overlaps the bottom,
   wherein the bottom comprises a receiving portion for receiving the sensor, and when viewed along a direction that is perpendicular to the main axis, a bottom surface of the bottom is farther away from the case than a bottom surface of the sensing assembly in a direction of the main axis, and wherein the optical element driving mechanism further comprises an adhesion element disposed in the receiving portion, and the adhesion element contacts the sensor and the circuit assembly.

2. The optical element driving mechanism as claimed in claim 1, wherein the adhesion element is disposed between the circuit assembly and the bottom, and the adhesion element contacts the circuit assembly and the bottom.

3. The optical element driving mechanism as claimed in claim 1, further comprising an outside-connection circuit member, wherein the sensor is electrically connected to the outside-connection circuit member via the circuit assembly.

4. An optical element driving mechanism, comprising:
a fixed part having a main axis, the fixed part comprising:
a case; and
a bottom, wherein the case and the bottom are arranged along the main axis;
a movable part moving relative to the fixed part, wherein the movable part may hold an optical element with an optical axis;
a driving assembly driving the movable part to move relative to the fixed part; and
a sensing assembly sensing a movement condition of the movable part relative to the fixed part, the sensing assembly comprising:
a sensor disposed on the bottom,
wherein the driving assembly drives the movable part to move relative to the fixed part along a direction that is parallel to the optical axis, the fixed part further comprises a circuit assembly electrically connected to the sensing assembly, and when viewed along the main axis, the driving assembly partially overlaps the circuit assembly,
wherein the optical element driving mechanism further comprises a loop member and an electrical connection piece, wherein a portion of the loop member is embedded in the bottom, and the circuit assembly is electrically connected to the loop member via the electrical connection piece.

5. The optical element driving mechanism as claimed in claim 4, wherein a portion of the electrical connection piece is disposed on a surface of the circuit assembly that faces the bottom.

6. The optical element driving mechanism as claimed in claim 4, wherein when viewed along a direction that is perpendicular to the main axis, the electrical connection piece is disposed between the bottom and the circuit assembly.

7. The optical element driving mechanism as claimed in claim 4, wherein when viewed along a direction that is perpendicular to the main axis, the electrical connection piece partially overlaps the case.

8. The optical element driving mechanism as claimed in claim 4, further comprising an adhesion element, wherein the adhesion element contacts the electrical connection piece and the case.

9. The optical element driving mechanism as claimed in claim 4, wherein the bottom further comprises an opening, and a portion of the electrical connection piece is disposed on an edge of the opening.

10. The optical element driving mechanism as claimed in claim 9, wherein when viewed along a direction that is perpendicular to the main axis, a portion of the bottom is located between the electrical connection piece and the case.

11. The optical element driving mechanism as claimed in claim 4, further comprising an elastic element, wherein the movable part is movably connected to the fixed part via the elastic element, and the sensor is electrically connected to the driving assembly via the circuit assembly, the loop member, and the elastic element consecutively.

12. The optical element driving mechanism as claimed in claim 11, wherein the electrical connection piece contacts the loop member, the elastic element, and the circuit assembly.

13. The optical element driving mechanism as claimed in claim 11, wherein the bottom further comprises a supporting platform, the elastic element is disposed on the supporting platform, and the supporting platform is closer to the case than the circuit assembly in a direction of the main axis.

14. The optical element driving mechanism as claimed in claim 13, wherein when viewed along the main axis, the supporting platform does not overlap the circuit assembly.

15. The optical element driving mechanism as claimed in claim 13, wherein when viewed along the main axis, the supporting platform does not overlap the sensor.

16. An optical element driving mechanism, comprising:
a fixed part having a main axis, the fixed part comprising:
a case; and
a bottom, wherein the case and the bottom are arranged along the main axis;
a movable part moving relative to the fixed part, wherein the movable part may hold an optical element with an optical axis;
a driving assembly driving the movable part to move relative to the fixed part; and
a sensing assembly sensing a movement condition of the movable part relative to the fixed part, the sensing assembly comprising a sensor disposed on the bottom,
wherein the driving assembly drives the movable part to move relative to the fixed part along a direction that is parallel to the optical axis, the fixed part further comprises a circuit assembly electrically connected to the sensing assembly, and when viewed along the main axis, the driving assembly partially overlaps the circuit assembly, and
wherein the optical element driving mechanism further comprises an electronic element and an adhesion element, the electronic element is disposed on the circuit assembly, and the adhesion element contacts the electronic element and the circuit assembly.

17. The optical element driving mechanism as claimed in claim 16, wherein when viewed along a direction that is perpendicular to the main axis, the sensor partially overlaps the bottom.

18. The optical element driving mechanism as claimed in claim 17, wherein the bottom comprises a receiving portion for receiving the sensor, and when viewed along a direction that is perpendicular to the main axis, a bottom surface of the bottom is farther away from the case than a bottom surface of the sensing assembly in a direction of the main axis.

19. The optical element driving mechanism as claimed in claim 18, wherein the adhesion element is disposed in the receiving portion, and the adhesion element contacts the sensor and the circuit assembly.

20. The optical element driving mechanism as claimed in claim 16, further comprising an outside-connection circuit member, wherein the sensor is electrically connected to the outside-connection circuit member via the circuit assembly.

\* \* \* \* \*